United States Patent
Yamada et al.

(10) Patent No.: US 6,816,178 B2
(45) Date of Patent: Nov. 9, 2004

(54) METHOD AND APPARATUS FOR COLOR IMAGE FORMING CAPABLE OF PERFORMING A PRECISE SYNCHRONIZATION BETWEEN TONER IMAGE FORMING PER COLOR AND ITS OVERLAYING

(75) Inventors: Yasufumi Yamada, Kanagawa-ken (JP); Mitsuru Takahashi, Kanagawa-ken (JP); Takuroh Kamiya, Tokyo (JP); Mikio Kamoshita, Tokyo (JP); Koichi Kudo, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/214,742

(22) Filed: Aug. 9, 2002

(65) Prior Publication Data

US 2003/0052957 A1 Mar. 20, 2003

(30) Foreign Application Priority Data

Aug. 9, 2001 (JP) .............................. 2001-242030

(51) Int. Cl.$^7$ .................. B41J 2/385; G01D 15/06; G03G 15/01
(52) U.S. Cl. .................. 347/116; 399/227; 399/302
(58) Field of Search .................. 347/116; 399/301, 399/225–227, 298, 308, 302, 300

(56) References Cited

U.S. PATENT DOCUMENTS

| | | | |
|---|---|---|---|
| 5,442,428 A | | 8/1995 | Takahashi et al. |
| 5,523,823 A | * | 6/1996 | Ashikaga .................... 347/116 |
| 5,574,558 A | | 11/1996 | Kudo et al. |
| 5,697,031 A | | 12/1997 | Kamiya et al. |
| 5,701,566 A | | 12/1997 | Basaiji et al. |
| 5,729,024 A | | 3/1998 | Baba et al. |
| 5,818,062 A | | 10/1998 | Baba et al. |
| 5,828,926 A | * | 10/1998 | Iwata et al. ................. 399/301 |
| 5,870,650 A | | 2/1999 | Takahashi et al. |
| 5,913,092 A | | 6/1999 | Bisaiji et al. |
| 5,929,436 A | | 7/1999 | Baba et al. |
| 5,950,052 A | * | 9/1999 | Nomura et al. ............. 399/301 |
| 5,983,060 A | | 11/1999 | Namekata et al. |
| 6,006,062 A | | 12/1999 | Takahashi et al. |
| 6,031,633 A | | 2/2000 | Andoh et al. |
| 6,035,157 A | | 3/2000 | Takahashi et al. |
| 6,223,008 B1 | | 4/2001 | Takahashi et al. |
| 6,252,682 B1 | | 6/2001 | Baba et al. |
| 6,269,228 B1 | | 7/2001 | Kayahara et al. |
| 6,359,638 B1 | * | 3/2002 | Saeki ......................... 347/116 |
| 6,445,900 B2 | | 9/2002 | Fukao et al. |

FOREIGN PATENT DOCUMENTS

| | | | | |
|---|---|---|---|---|
| JP | 10083103 A | * | 3/1998 | .......... G03G/15/00 |
| JP | 2001066909 A | * | 3/2001 | .......... G03G/15/16 |

OTHER PUBLICATIONS

U.S. patent application Ser. No. 10/663,766, Takuroh, filed Sep. 17, 2003.
U.S. patent application Ser. No. 10/740,672, Kamiya, filed Dec. 22, 2003.

* cited by examiner

Primary Examiner—Susan Lee
(74) Attorney, Agent, or Firm—Oblon, Spivak, McClelland, Maier & Neustadt, P.C.

(57) ABSTRACT

An image forming apparatus including a drum, an optical scanning mechanism, a development mechanism, an intermediate transfer member, movement detecting mechanisms, and a controller. The intermediate transfer member is rotated in synchronism with a rotation of the drum and receives color toner image multiple times to form thereon a composite color toner image including multiple images of different color toners overlaying one to another. The movement detecting mechanisms detect respective movements of the drum and the intermediate transfer member. The controller controls respective rotations of the drum and the intermediate transfer member with results of respective detection performed by the movement detecting mechanisms.

57 Claims, 14 Drawing Sheets

METHOD AND APPARATUS FOR COLOR IMAGE FORMING CAPABLE OF PERFORMING A PRECISE SYNCHRONIZATION BETWEEN TONER IMAGE FORMING PER COLOR AND ITS OVERLAYING

BACKGROUND OF THE INVENTION

1. Field of the Invention

The present invention relates to a method and apparatus for color image forming, and more particularly to a method and apparatus for color image forming that is capable of performing a precise synchronization between a toner image forming per color and its overlaying with an improved optical synchronization mechanism.

2. Discussion of the Background

In recent years, a color document is a rapidly growing tendency in offices and as a consequence an image forming apparatus such as a copying machine, a printer, a facsimile machine, etc., is also needed to have a color function. In line with an increasing demand for a high quality and a fast speed in office work, the color image forming apparatus is required for a high image quality and a fast processing speed.

Conventionally, a color image forming apparatus in response to such requirements uses a transfer drum method. The color image forming apparatus is provided with a photosensitive drum for forming different color images thereon one by one, and a transfer drum for holding a transfer sheet and transferring the different color images onto the recording sheet in a form overlaying one to another. Another color image forming apparatus in response to such requirements uses a transfer belt method wherein the color image forming apparatus is provided with at least one photosensitive drum and a transfer belt in place of the transfer drum.

In the color image forming apparatus using the transfer drum method, one color image is formed on the photosensitive drum each time the photosensitive drum makes a turn, and different color images are sequentially formed on the photosensitive drum to sequentially transfer the different color images onto the transfer drum. Thereby, a composite color image is formed on the transfer drum and is then transferred onto a transfer sheet. This color image forming procedure not only takes a relatively long time, but it is complex to improve the process speed. Further, this color image forming has a drawback in which performance of the image transferring is varied depending upon a type of transfer sheets, thus, limiting the type of transfer sheets that are used.

In contrast to the above, the color image forming apparatus using the transfer belt method forms different color images on a plurality of photosensitive drums and transfers the different color images onto the transfer belt in an overlaying form to generate a composite color image on the transfer belt which is then transferred onto a transfer sheet. As an alternative, in the color image forming apparatus having an intermediate transfer belt, the different color images are tentatively transferred onto the intermediate transfer belt in an overlaying form to generate a composite color image which is then transferred onto a transfer sheet. It is possible to improve the process speed in these color image forming procedures using the transfer belt method. In addition, this color image forming method does not limit the type of transfer sheets.

FIG. 1 shows a background color image forming apparatus using the transfer belt method. As shown in FIG. 1, the color image forming apparatus includes a laser diode 100, a laser light detector 101, a polygon mirror 102, a mirror 103, a roller motor 104, a driving roller 105, an intermediate transfer belt 106, a photosensitive drum 107, a development unit 108, a transfer roller 109, supporting rollers 110, 111, 112, and 113, and a drum motor 114.

The laser diode 100 emits a laser light beam L modulated in accordance with specific color image data. The polygon mirror 102 is rotated by a polygon motor (not shown) to deflect the laser light beam L. The laser light detector 101 detects the laser light as a scan sync signal each time the laser light beam L completes a line scanning motion. The mirror 103 deflects the laser light beam L towards the photosensitive drum 107. The roller motor 104 drives the driving roller 105 to rotate the intermediate transfer belt 106 which is supported by the transfer roller 109 and the supporting rollers 110–113 to partly contact with the photosensitive drum 107, as shown in FIG. 1. The photosensitive drum 107 has a photosensitive surface and is driven by the drum motor 114.

By exposure to the modulated laser light beam L, an electrostatic latent image for a specific color is formed on the photosensitive surface of the photosensitive drum 107. The development unit 108 includes development assemblies 108a, 108b, 108c, and 108d for containing cyan (C), magenta (M), yellow (Y), and black (K) color toners and developing the electrostatic latent image with a corresponding color toner to form a specific color toner image on the photosensitive drum 107. The transfer roller 109 receives a bias voltage from a power source (not shown) and transfers with the bias voltage the specific color toner image formed on the photosensitive drum 107 onto the intermediate transfer belt 106. Formation of specific color toner image on the photosensitive drum 107 is repeated for the colors of C, M, Y, and B, and the formed color images are in turn transferred onto the intermediate transfer belt 106 in a form of overlaying one to another. Thereby, a composite color toner image is formed on the intermediate transfer belt 106. The composite color toner image thus formed is transferred onto a recording sheet with a secondary transfer mechanism (not shown). Consequently, a final color image is formed on the recording sheet.

The above-described color image forming apparatus controls the drum motor 114 to drive the photosensitive drum 107 in a precise manner so as to control a position of toner image forming to be precisely constant on the surface of the photosensitive drum 107. However, it is not easy to avoid variations in this position due to various factors such as, for example, a manufacturing error in the photosensitive drum itself, a displacement of a mounting position, and so on. As a result, the position of toner image forming is varied, and the background color image forming apparatus fails to form a high precision multi-color toner image.

Furthermore, a problem is encountered on the overlaying images on the intermediate transfer belt 106. That is, the image transfer to the intermediate transfer belt 106 takes place one color image after another color image. Therefore, image transferring needs to be synchronized with the rotation of the photosensitive drum 107, and the synchronization should be controlled in a precise manner. This synchronization is generally performed with a marking/marker provided to an edge of the intermediate transfer belt 106. By reading this marking, a signal is generated to represent a timing that the intermediate transfer belt 106 starts its rotation. With this signal, the image forming on the photosensitive drum 107 is initiated so that the synchronization between the image forming on the photosensitive drum 107 and the rotation of the intermediate transfer belt 107 is obtained.

However, the above-described procedure for obtaining the synchronization has a drawback in which the synchronization is made in a relatively good condition at the leading side of the images but it is prone to be out of order. As a result, the resultant color toner image is distorted. This is due to the mechanism of the intermediate transfer belt 106. That is, different from the photosensitive drum 107, the intermediate transfer belt 106 receives varying loads of mechanisms for cleaning, discharging, and transferring during a rotation cycle. These mechanisms are switched between two positions to connect and disconnect the intermediate transfer belt 106. In addition, the intermediate transfer belt 106 is supported with a plurality of rollers and each of which may have a manufacturing error and a center displacement. Accordingly, these undesirable factors may irregularly affect the rotation of the intermediate transfer belt 106.

An exemplary measurement result of position variations caused on the surface of the intermediate transfer belt 106 per one rotation is shown in FIG. 2A. It is presumed from this graph that the peak of the variations is at the center in each rotation. FIG. 2B shows the position variations per color. That is, when the color image forming apparatus operates under the conditions as shown in FIG. 2A, the respective color images having the position variations shown in FIG. 2B are overlaying one to another on the intermediate transfer belt 106.

SUMMARY OF THE INVENTION

To overcome the above-identified problems, the present invention proposes a novel image forming apparatus. In one exemplary embodiment, the image forming apparatus includes a drum, an optical scanning mechanism, a development mechanism, an intermediate transfer member, a plurality of movement detecting mechanisms, and a controller. The drum is configured to have a photosensitive surface. The optical scanning mechanism is configured to deflect a laser light beam modulated in accordance with image data per color to form a latent image on the photosensitive surface of the drum. The development mechanism is configured to include a plurality of different color toners and to develop the latent image formed on the photosensitive surface of the drum with a corresponding color toner into a color toner image. The intermediate transfer member is configured to be rotated in synchronism with a rotation of the drum and to receive the color toner image multiple times to form thereon a composite color toner image including multiple images of the different color toners overlaying on one another. The plurality of movement detecting mechanisms are configured to detect respective movements of the drum and the intermediate transfer belt. The controller is configured to control respective rotations of the drum and the intermediate transfer belt with results of respective detection being performed by the plurality of movement detecting mechanisms.

The optical scanning mechanism preferably generates a sync signal per line scanning. The drum and the intermediate transfer belt may have respective patterns uniformly spaced on at least one of front and inside side edges of the drum and the intermediate transfer belt. The plurality of movement detecting mechanisms may include respective optical detecting devices configured to detect the respective patterns of the drum and the intermediate transfer belt and to generate respective pattern detection signals. The controller may compare the respective pattern detection signals from the respective optical detecting devices for the drum and the intermediate transfer belt with the sync signal from the optical scanning mechanism, and controls rotation of the intermediate transfer belt and rotation of the drum in synchronism with rotation of the intermediate transfer belt.

The above-mentioned color image forming apparatus may further include a plurality of supporting members configured to drive and support the intermediate transfer belt, and to keep distance from the pattern provided to the intermediate transfer The above-mentioned color image forming apparatus may further include a cleaning member configured to clean off a surface of the pattern provided to the intermediate transfer belt.

The above-mentioned color image forming apparatus may further include a cleaning member configured to clean off a surface of the pattern provided to the drum.

The above-mentioned color image forming apparatus may further include a discharging member configured to discharge an electric charge from a surface of the pattern provided to the intermediate transfer belt.

The above-mentioned color image forming apparatus may further include a discharging member configured to discharge an electric charge from a surface of the pattern provided to the drum.

Each of the respective patterns provided to the drum and the intermediate transfer belt may be divided into a plurality of short patterns arranged in parallel in at least two rows.

Each of the respective patterns provided to the drum and the intermediate transfer belt may be an integral multiple of an image writing pitch according to a resolution of the optical scanning mechanism.

At least one of the respective optical detecting devices for the drum and the intermediate transfer belt may be arranged at a position close to a position where the drum contacts the intermediate transfer belt.

The plurality of short patterns arranged in parallel in at least two rows may be arranged with space between at least two rows. The patterns are read with a single optical detector which generates a composite detection signal for each of the drum and the intermediate transfer belt, and the controller may control the rotation of each of the drum and the intermediate transfer belt.

The plurality of short patterns arranged in parallel in at least two rows may be arranged in an overlaid manner between at least two rows and with a single pitch and are read with a single optical detector which generates a composite detection signal for each of the drum and the intermediate transfer belt, and the controller may control the rotation of each of the drum and the intermediate transfer belt.

The above-mentioned color image forming apparatus may further include a cleaning mechanism configured to clean a residual toner off of a surface of the intermediate transfer belt. In this case, the pattern provided to the intermediate transfer belt includes a reference base mark. The optical detecting device for reading the pattern provided to the intermediate transfer belt detects the reference base mark and generates a reference base mark signal, and the controller includes a counting circuit configured to count a number of pattern detection signals based on the reference base mark signal. The controller controls a connection and disconnection motion of the cleaning mechanism to the intermediate transfer belt based on the count of the number of pattern detection signals.

The above-mentioned color image forming apparatus may further include a secondary transfer mechanism configured to transfer the composite color toner image formed on the intermediate transfer belt onto a recording sheet. In this case, the pattern provided to the intermediate transfer belt includes a reference base mark. The optical detecting device for reading the pattern provided to the intermediate transfer belt detects the reference base mark and generates a reference base mark signal. The controller includes a counting circuit configured to count a number of pattern detection signals based on the reference base mark signal and controls the secondary transfer mechanism to transfer the composite color toner image formed on the intermediate transfer belt onto a recording sheet.

The above-mentioned color image forming apparatus may further include a registration roller configured to feed a recording sheet towards the intermediate transfer belt in synchronism with a rotation of the intermediate transfer belt. In this case, the pattern provided to the intermediate transfer belt includes a reference base mark, the optical detecting device for reading the pattern provided to the intermediate transfer belt detects the reference base mark and generates a reference base mark signal. The controller includes a counting circuit configured to count a number of pattern detection signals based on the reference base mark signal and controls the registration roller to feed a recording sheet towards the intermediate transfer belt in synchronism with the rotation of the intermediate transfer belt.

The optical detecting device may be arranged at a position at which the intermediate transfer belt is in a horizontal position. The optical detecting device may be further arranged at a position at which a mechanical vibration less occurs.

The above-mentioned color image forming apparatus may further include a damper mechanism configured to reduce mechanical vibrations affecting the intermediate transfer belt.

The pattern provided to the intermediate transfer belt may include a reference base mark. The optical detecting device for reading the pattern provided to the intermediate transfer belt may detect the reference base mark and generates a reference base mark signal. The controller may include a pattern detection counting circuit configured to count a number of pattern detection signals based on the reference base mark signal and a clock signal counter configured to count, based on the reference base mark signal, a number of clock signals having a clock cycle at least shorter than a cycle of the pattern detection signals. The controller may control a rotation of the intermediate transfer belt based on a number of pattern detection signals and a number of clock signals counted during two sequential pulses of the reference base mark signal.

The optical detecting device may use multiple light beams to detect the patterns.

The present invention further describes a novel color image forming method capable of performing precise synchronization between toner image formation per color component and the overlaying of color components. In one example embodiment, the method includes the steps of rotating, deflecting, developing, receiving, detecting, and controlling steps. A first rotating step rotates a photosensitive surface. The deflecting step deflects a laser light beam modulated in accordance with image data per color to form a latent image on the photosensitive surface. The developing step develops the latent image formed on the photosensitive surface into a color toner image with a corresponding color toner from among a plurality of different color toners. A second rotating step rotates intermediate transferring belt in synchronism with a rotation of the photosensitive surface.

The receiving step receives the color toner image multiple times to form a composite color toner image including multiple images of the different color toners overlaying one to another on the intermediate transfer belt. The detecting step detects respective movements of the photosensitive surfaces and the intermediate transferring belt. The controlling step controls respective rotations of the photosensitive surfaces and the intermediate transferring belt with results of respective detection performed by the detecting step.

The deflecting step may generate a sync signal per line scanning. In this case, the photosensitive surface and the intermediate transferring belt have respective patterns uniformly spaced on at least one of a front and inside side edges of the photosensitive surface and the intermediate transferring belt. The detecting step detects the respective patterns of the photosensitive surface and the intermediate transferring belt and generates respective pattern detection signals. The controlling step compares the respective pattern detection signals for the photosensitive surface and the intermediate transferring belt with the sync signal from the deflecting step and controls rotation of the intermediate transferring belt and rotation of the photosensitive surface in synchronism with rotation of the intermediate transferring belt.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
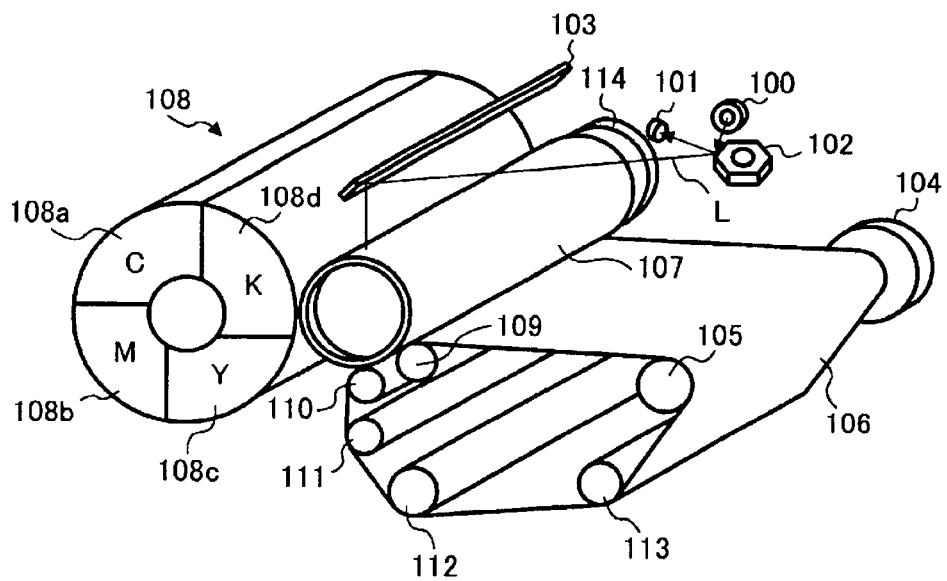
FIG. 1 is a schematic view of a background color image forming apparatus.
Figure 2A:
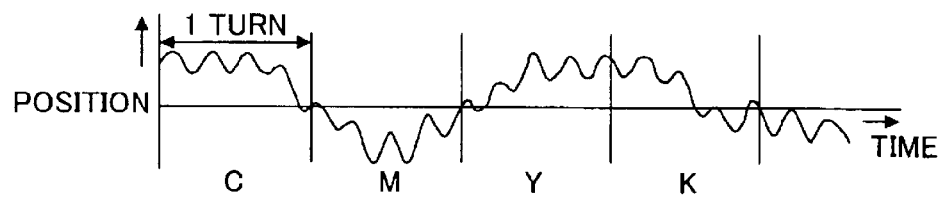
FIGS. 2A and 2B are graphs of variations in positions of an intermediate transfer belt of the background color image forming apparatus of FIG. 1.
Figure 2B:
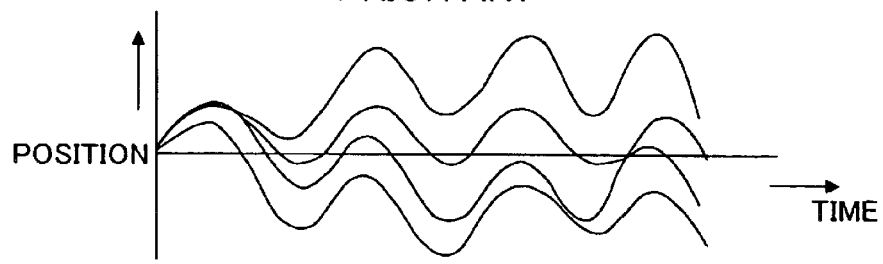

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 3:
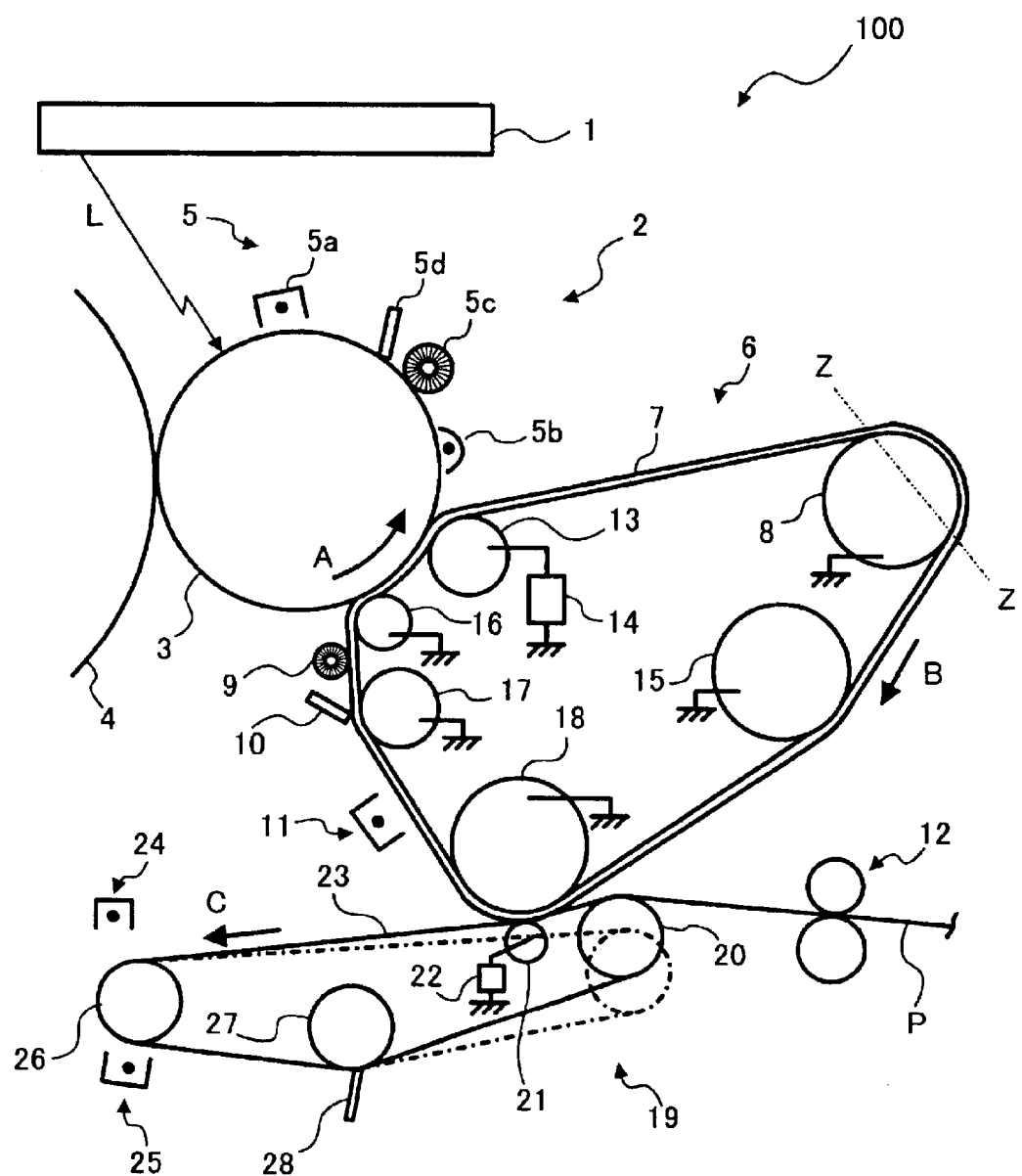
FIG. 3 is a schematic view of a color image forming apparatus according to a preferred embodiment of the present invention.

Referring now to the drawings, wherein like reference numerals designate identical or corresponding parts throughout the several views, FIG. 3 shows a color image forming apparatus 100 according to a preferred embodiment of the present invention. FIG. 3 illustrates in diagrammatic form an exemplary structure of the color image forming apparatus 100. The color image forming apparatus 100 includes an optical unit 1, an image forming mechanism 2, an intermediate transfer mechanism 6, a pair of registration rollers 12, and a secondary transfer mechanism 20.

The optical unit 1 emits a laser light beam L having a predetermined wavelength and modulated in accordance with image data of a specific color component. The image forming mechanism 2 includes a photosensitive drum 3, a development unit 4, and an associated component set 5. The associated component set 5 includes a main charging unit 5a, a discharging unit 5b, a cleaning brush 5c, and a cleaning blade 5d. The main charging unit 5a, the development unit 4, the discharging unit 5b, the cleaning brush 5c, and the cleaning blade 5d are arranged around the photosensitive drum 3, as illustrated in FIG. 3. These components perform charging, developing, discharging, and cleaning processes, respectively, according to an electrographic method.

The photosensitive drum 3 has a photosensitive surface and is rotated in a direction A. The main charging unit 5a evenly provides an electrical charge to the entire photosensitive surface of the photosensitive drum 3 which is then exposed to the laser light beam L so that an electrostatic latent image is formed thereon. The development unit 4 develops the electrostatic latent image formed on the photosensitive drum 3 with color toner so as to generate a color toner image. The discharging unit 5b discharges the electrical charge carried on the photosensitive surface of the photosensitive drum 3 after a completion of an image transfer process performed by the intermediate transfer mechanism 6. The cleaning brush 5c and the cleaning blade 5d removes residual toner particles from the photosensitive surface of the photosensitive drum 3.

When the photosensitive drum 3 rotating in the direction A is exposed to the laser light beam L, a portion of the photosensitive surface exposed to the laser light beam L loses the electrical charge and a portion not exposed to the laser light beam L maintains the charge. Thereby, an electrostatic image is generated according to image data of a specific color component in a latent form on the photosensitive surface of the photosensitive drum 7.

The intermediate transfer mechanism 6 includes an intermediate transfer belt 7, a driving roller 8, a cleaning unit 9, a cleaning blade 10, a discharging unit 11, a transfer roller 13, a transfer power source 14, and supporting rollers 15, 16, 17, and 18.

The intermediate transfer belt 7 is an endless belt rotated by the driving roller 8 in a direction B. A specific color toner image formed on the photosensitive drum 3 is transferred to the intermediate transfer belt 7 by the action of the transfer roller 13. By transferring a plurality of individual specific color toner images to the same position on the intermediate transfer belt 7, a composite color toner image is formed thereon. The supporting rollers 15, 16, 17, and 18 respectively support the intermediate transfer belt 7. The transfer roller 13 applies a transfer voltage (i.e., a first bias voltage) to the intermediate transfer belt 7 to attract the toner particles of the composite color toner image formed on the photosensitive drum 3, thereby transferring the composite color toner image onto the intermediate transfer belt 7. The transfer power source 14 supplies the transfer voltage (i.e., the first bias voltage) to the transfer roller 13. The discharging unit 11 discharges the electrical charge carried on the intermediate transfer belt 7. Each of the cleaning unit 9 and the cleaning blade 10 remove the residual toner particles from the intermediate transfer belt 7.

The pair of registration rollers 12 perform a sheet registration in which a recording sheet P, fed from a recording sheet container (not shown), is stopped and is then started in synchronism with the image forming process to determine a position of the recording sheet P relative to the toner image to be transferred onto the recording sheet P.

The secondary transfer mechanism 19 includes a supporting roller 20, a bias roller 21, a bias power source 22, a secondary transfer belt 23, a secondary transfer charging unit 24, a discharging unit 25, a driving roller 26, an tension roller 27, and a cleaning unit 28.

The supporting roller 20 supports the secondary transfer belt 23 and includes a shift mechanism for switching between two positions so as to cause the secondary transfer belt 23 to contact and to move away from the intermediate transfer belt 7, as illustrated in ghost lines in FIG. 3. The bias roller 21 applies a secondary transfer voltage (i.e., a second bias voltage) to the secondary transfer belt 23 to attract the toner particles of a toner image (i.e., the composite color toner image) formed on the intermediate transfer belt 7. Thereby, the toner composite color image is transferred onto the secondary transfer belt 23. The bias power source 22 supplies the secondary transfer voltage (i.e., the second bias voltage) to the bias roller 21. The secondary transfer charging unit 24 applies a sheet separation voltage to the recording sheet P to remove it from the secondary transfer belt 23. The discharging unit 25 discharges the electric charges born on the secondary transfer belt 23. The driving roller 26 drives the secondary transfer belt 23 to rotate in a direction C. The tension roller 27 provides an appropriate tension to the secondary transfer belt 23. The cleaning unit 28 removes the residual toner particles from the surface of the secondary transfer belt 23.

The image forming apparatus 100 shown in FIG. 3 performs an image forming operation in the following manner. The photosensitive drum 3 is rotated and subjected to cyclic and sequential processes according to the electrographic method, including charging, exposure, image development, image transfer, discharging, and cleaning processes performed with the above-described components. After generation of an electrostatic latent image in accordance with the laser light beam L modulated based on specific color image data on the photosensitive drum 3, the specific color image is developed with a specific color toner by the development unit 4 and is then transferred onto the intermediate transfer belt 7 by the transfer action of the transfer roller 13. This procedure is repeated for each of the color components, and a plurality of individual color toner images thus developed are precisely placed in substantially same positions to form a composite color toner image on the intermediate transfer belt 7, the composite color toner image on the intermediate transfer belt 7, the composite color image being formed from individual color components of the image.

During this procedure, the secondary transfer mechanism 19 is positioned, as indicated by the ghost lines with the shift mechanism of the supporting roller 20, so as to be separated from the intermediate transfer mechanism 6. At a predetermined time after forming the above-mentioned composite color toner image on the intermediate transfer belt 7, the shift mechanism of the supporting roller 20 is driven to cause the secondary transfer belt 23 to contact the intermediate transfer belt 7, and the registration rollers 12 are driven to insert the recording sheet P between the intermediate transfer belt 7 and the secondary transfer belt 23.

Subsequently, the composite color toner image is transferred from the intermediate transfer belt 7 onto the secondary transfer belt 23 with the secondary transfer voltage (i.e., the second bias voltage) supplied to the bias roller 21 from the bias power source 22.

Figure 4:
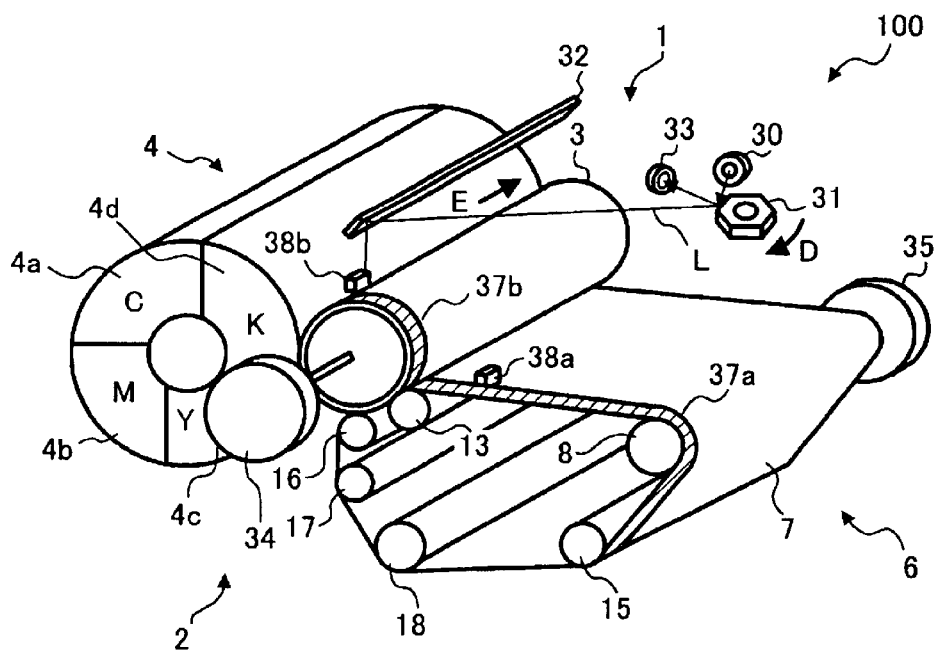
FIG. 4 is a perspective schematic view of the color image forming apparatus of FIG. 3.

FIG. 4 illustrates a perspective view of the color image forming apparatus 100. As illustrated in FIG. 4, the optical unit 1 includes a laser diode 30, a polygon mirror 31, a mirror 32, and a laser light detector 33. The laser diode emits the laser light beam L, which is modulated in accordance with the specific color image data, as described above. The polygon mirror 31 is rotated in a direction D by a polygon motor (not shown) to deflect the laser light beam L to scan the surface of the mirror 32 in a direction E which is the same direction as a main scanning direction on surface of the photosensitive drum 3. The mirror 32 deflects the laser light beam L towards the surface of the photosensitive drum 3. The laser light detector 33 detects the laser light beam L in the end side of the scanning each time the laser light L scans the mirror 32.

As illustrated in FIG. 4, the development unit 4 of the image forming mechanism 2 further includes development devices 4a, 4b, 4c, and 4d for developing cyan (C), magenta (M), yellow (Y), and black (K) images, respectively. The development unit 4 is revolved to bring one of these development devices 4a-4d to a development position to face the photosensitive drum 3 to develop an electrostatic latent image with its color toner. In accordance with a distribution order of the colors, these development devices 4a-4d are in turn brought to the development position. Thereby, the toner images in the C, M, Y, and K colors are sequentially developed on the photosensitive drum 3 to be transferred onto the intermediate transfer belt 7.

In addition, the image forming mechanism 2 further includes a drum motor 34 for driving the photosensitive drum 3, and the intermediate transfer mechanism 6 further includes a roller motor 35 for driving the driving roller 8 to rotate the intermediate transfer belt 7.

Further, as illustrated in FIG. 4, in the color image forming apparatus 100, the intermediate transfer belt 7 is provided with an optical pattern 37a on a side edge circumference thereof and an optical detector 38a mounted at a position at which the optical detector 38a can detect the optical pattern 37a. Further, the photosensitive drum 3 is provided with an optical pattern 37b on a side edge circumference thereof which is the same side of the intermediate transfer belt 7 having the pattern 37a. To detect the optical pattern 37b formed on the side edge circumference of the photosensitive drum 3, an optical detector 38b is provided at a position close to such optical pattern 37b.

Figure 5:
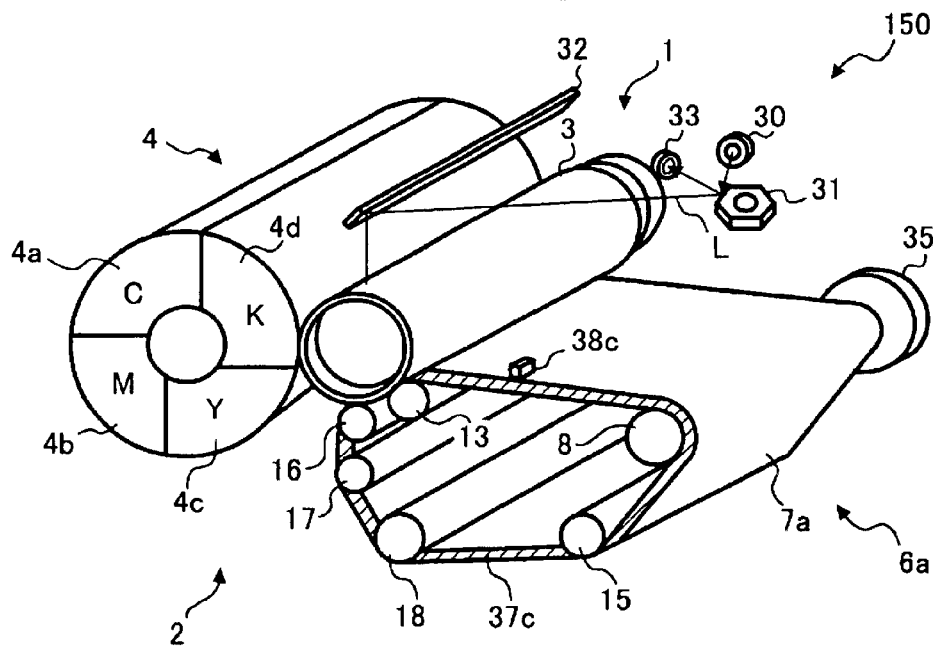
FIG. 5 is a perspective schematic view of another color image forming apparatus according to a preferred embodiment of the present invention.

FIG. 5 illustrates a color image forming apparatus 150 which is similar to the color image forming apparatus 100 of FIG. 3, except for a modification with respect to the optical pattern 37a formed on the intermediate transfer belt 7 of FIG. 4. That is, an intermediate transfer mechanism 6a includes an intermediate transfer belt 7a which is provided with a slit pattern 37c instead of the optical pattern 37a. The slit pattern 37c includes a plurality of slits. To read this slit pattern 37b, a slit detector 38c is provided instead of the optical detector 38b.

The above-mentioned optical pattern 37a, as shown in FIG. 4, can be formed on the same side edge circumference but inside of the intermediate transfer belt 7. In such a situation, the optical detector 38a needs to be mounted at a position inside the intermediate transfer belt 7. Also, the optical pattern 37b can be formed on the same side edge circumference but inside of the photosensitive drum 3 and accordingly the optical pattern 38b needs to be mounted at a suitable position to read the optical pattern 37b.

Each of the optical patterns 37a and 37b is formed along the side edge circumference of the intermediate transfer belt 7 and has a predetermined cyclic pattern of varying reflectance. These optical patterns 37a and 37b are used as position indicators. The optical detector 38a and 38b include a photo-electric converting element using light reflection or a translucent to detect the optical patterns 37a and 37b, respectively.

Figure 6:
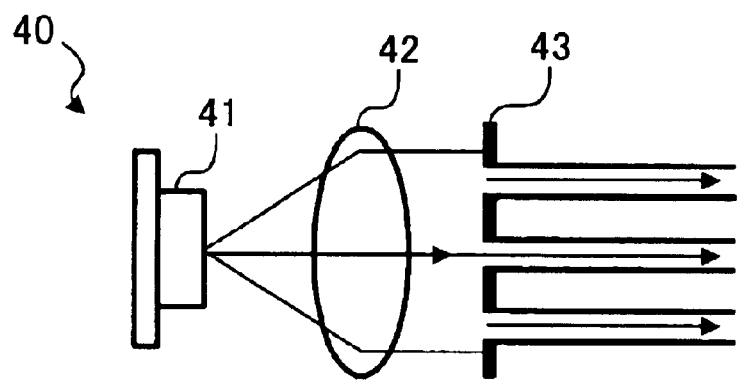
FIG. 6 is a schematic illustration for explaining an optical pattern detector for detecting a surface position of an intermediate transfer belt.

FIG. 6 illustrates a multi-beam generator 40 as one example of a light generating assembly of the optical detectors 38a and 38b. The multi-beam generator 40 includes a light source 41, a lens 42, and a slit mask 43. The light source 41 emits light, the lens 42 gathers the light, and the slit mask 43 divides the light into multiple beams.

Figure 7:
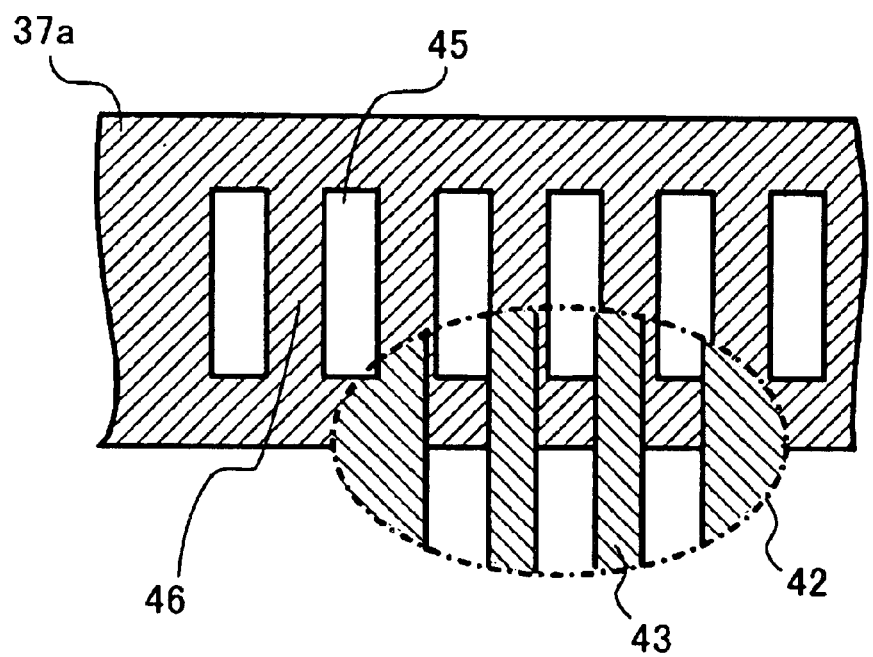
FIG. 7 is a schematic illustration for explaining an optical pattern formed on the intermediate transfer belt.

FIG. 7 illustrates an exemplary optical pattern 37a. The optical pattern 37a includes a plurality of slits 45 arranged in a predetermined cyclic pattern. That is, the plurality of slits 45 have a constant space 46 between two adjacent slits. This constant space 46 is used as a light masking portion. The multi-beam generator 40 generates the multiple beams with a predetermined space between two adjacent beams so that the multiple beams simultaneously read more than two slits 45. It is preferable that the cycle of the multiple beams is substantially equal to the cycle of the slit pattern of the optical pattern 37a. When such multiple beams irradiate the above-described optical pattern 37a, which is moving, the multiple beams cyclically cause reflection and translucent with the alternating arrangement of the masking portions 46 and the slits 45. This cyclic reflection and translucent of the multiple beams is detected with a light receiving element (i.e., a photodiode), not shown. Based on this detection, a signal that represents a moving speed and a relative position of the intermediate transfer belt 7 can be generated.

Figure 8:
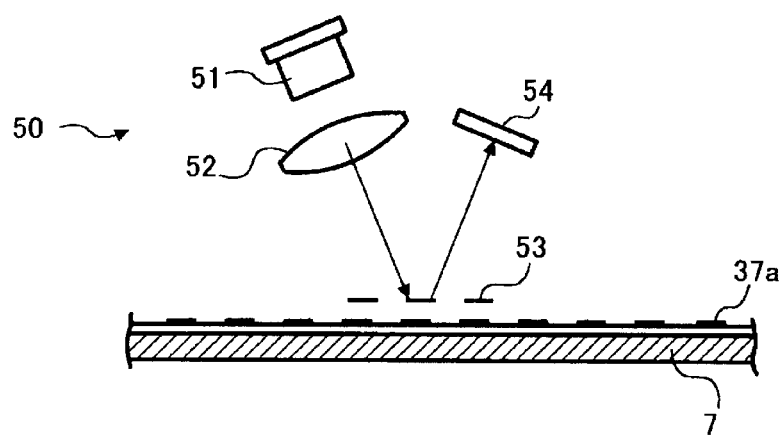
FIG. 8 is a schematic illustration for explaining an optical pattern detection system.

FIG. 8 illustrates an optical detector 50 as another example of the optical detectors 38a and 38b. The optical detector 50 includes a light source 51, a lens 52, a mask slit 53, and a photodiode 54. The light source 51 emits light and the lens 52 gathers light to irradiate the optical pattern 37a formed on the intermediate transfer belt 7 via the mask slit 53. When the optical pattern 37a is moved, light from the lens 52 causes reflection and translucent relative to the mask slit 53 with the moving optical pattern 37a. As a result, the photodiode 54 receives the light which is substantially similar to the light obtained with the multi-beam generator 40.

The optical pattern 37a can be formed with any one of etching, printing, or photographic emulsion techniques. For example, the optical pattern 37a can be made of a flexible material and adhered to the circumference side edge of the intermediate transfer belt 7. The optical pattern 37a may be a adhesive tape. As an alternative, an optical pattern can directly be printed on the intermediate transfer belt 7. In addition, the optical pattern itself is not limited to rectangle shape but can be in any shape.

Although the operations of optical pattern 37a and the optical detector 38a are explained above, it should be understood that substantially similar explanation is applicable to the operations of the optical pattern 37b and the optical detector 38b.

Figure 9:
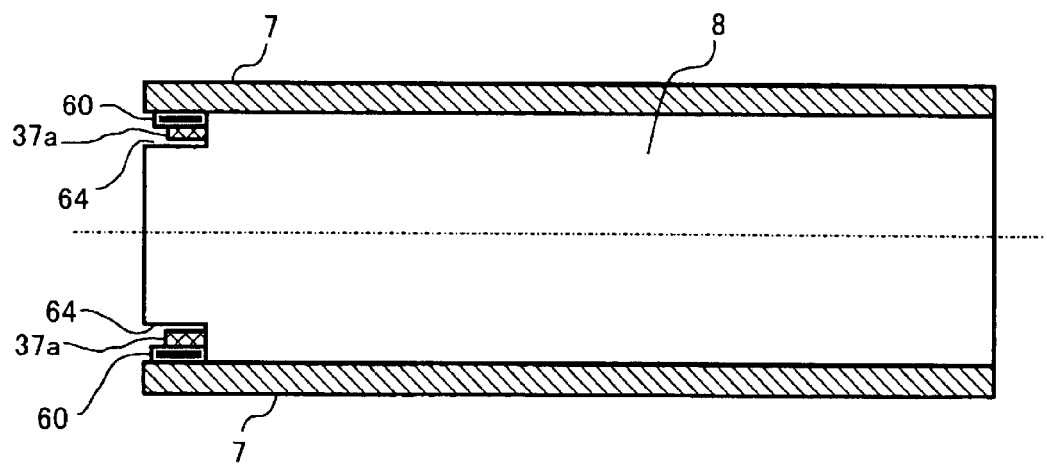
FIG. 9 is a schematic illustration for protecting the optical pattern from being rubbed by rollers associated with the intermediate transfer belt in an exemplary embodiment of the present invention.

FIG. 9 is a cross-sectional view of the intermediate transfer belt 7 and the driving roller 8 taken on line Z—Z of FIG. 3. When the optical pattern 37a is fixed on an inside of the intermediate transfer belt 7, it is preferable that the optical pattern 37a is not rubbed and worn by the driving roller 8, the transfer roller 13, and the supporting rollers 15, 16, 17, and 18. In order to achieve this and prevent deterioration of the optical pattern 37a, the optical pattern 37a is fixed on a stopper 60 which is provided on an inside circumference edge thereof to prevent the intermediate transfer belt 7 from skewing. On the other hand, edges of the driving roller 8, the transfer roller 13, and the supporting rollers 15, 16, 17, and 18 are modified. That is, as illustrated in FIG. 9, the driving roller 8, for example, has an edge portion 64 having a diameter shorter than other portion of the driving roller 8 so that the optical pattern 37a is not rubbed by the surface of the driving roller 8 when it is rotated.

With the above-described structure of a mechanism relating to the optical pattern detection, the optical pattern 37a is prevented from a damage caused by rubbing against the rollers. In addition, if the rollers touch the optical pattern 37a formed inside the intermediate transfer belt 7, the intermediate transfer belt 7 may eccentrically move or may cause variations in moving speed. However, with the above-mentioned structure as illustrated in FIG. 9, the rollers do not touch the optical pattern 37a and therefore the intermediate transfer belt 7 is prevented from causing eccentric movement and variations in a moving speed.

Furthermore, if the driving roller 8 has no edge portion 64, it presses toner or dust particles against the optical pattern 37a. To prevent deposition of toner and dust particles on the optical pattern 37a, it is preferable to make the optical pattern 37a from a water repellant or an oil repellant material. When toner or a dust is attached to the optical pattern 37a, it may not be pressed against the optical pattern 37a by the rollers since the rollers include the edge portion 64. Therefore, an additional mechanism for removing the toner and dust particles from the optical pattern 37a is not needed.

Figure 10:
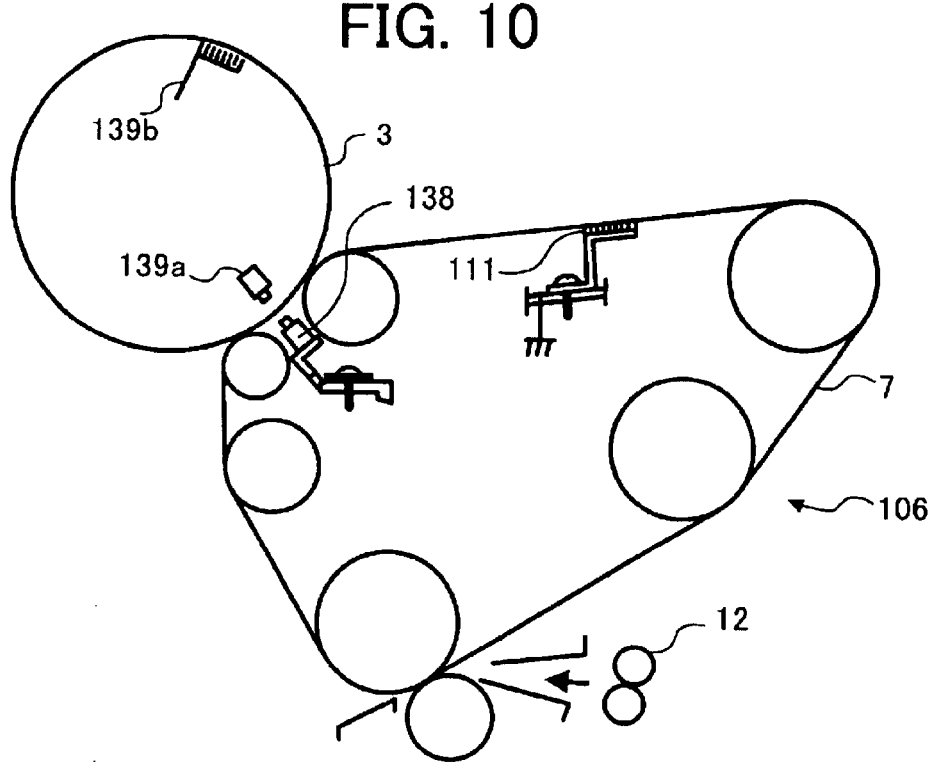
FIG. 10 is a schematic illustrating installation of a cleaning and discharging brush and an optical pattern to the intermediate transfer belt.

Referring to FIG. 10, an intermediate transfer mechanism 106 according to another preferred embodiment of the present invention is illustrated, which is similar to the intermediate transfer mechanism 6 shown in FIG. 3, except for a cleaning and discharging brush 111 and an optical detector 138. In a color image forming apparatus, the toner dispersion problem is prone to occur particularly around an intermediate transfer belt, and therefore a countermeasure is needed to protect precision components such as those related to the optical detection from becoming dirty with toner. In this exemplary embodiment, the optical pattern 37a is fixed on the inside surface of the intermediate transfer belt 7. The cleaning and discharging brush 111 includes a brush for softly cleaning off and discharging an object. This cleaning and discharging brush 111 is arranged at a position so as to contact and clean off the optical pattern 37a, as illustrated in FIG. 10. At the same time, the cleaning and discharging brush 111 discharges electrical charges from the area of the optical pattern 37a. The brush element of the cleaning and discharging brush 111 may be made of, for example, a sponge, a felt, or the like.

The optical detector 138 is similar to the optical detector 38a shown in FIG. 4, and is arranged at a position close to a place where the photosensitive drum 3 contacts the intermediate transfer belt 7. With this arrangement, the optical detector 138 is capable of detecting more direct variations in the moving speed and the position of the intermediate transfer belt 7 than the detections performed at any other places. Furthermore, at a position located close to the place where the photosensitive drum 3 contacts the intermediate transfer belt 7, the optical detector 138 may detect such direct variations with a high degree of precision, even when the variations involve an expansion of the intermediate transfer belt 7 caused by a variety of factors.

Further, it is preferable to mount the optical detector 138 at a place where minimal mechanical vibrations occur. For example, the optical detector 138 is minimally affected from mechanical vibrations at a place where the photosensitive drum 3 contacts the intermediate transfer belt 7, since the mechanical vibration is reduced at the place where the photosensitive drum 3 contacts the intermediate transfer belt 7. It is also preferable to provide a damper mechanism for reducing mechanical vibrations affecting the intermediate transfer belt 7. For example, the above-mentioned cleaning and discharging brush 111 may function as such a damper mechanism.

In FIG. 10, reference numeral 139a denotes an exemplary optical detector for detecting the optical pattern 38b formed in inside edge of the photosensitive drum 3, and reference numeral 139b denotes a cleaning and discharging brush for cleaning off the surface of the optical pattern and discharging the electrical charges born thereon.

Figure 11:
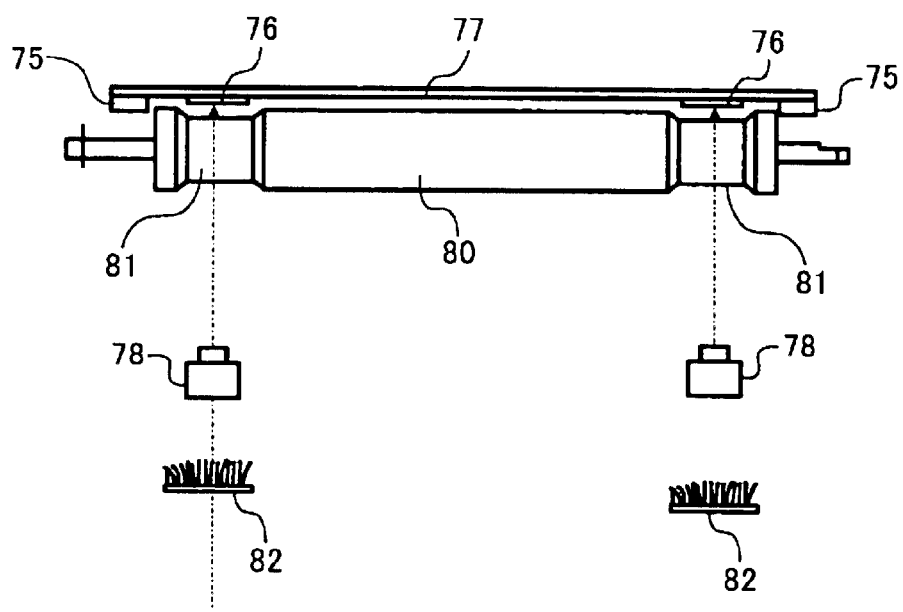
FIG. 11 is a schematic illustration of another example embodiment of the present invention wherein the intermediate transfer belt includes two optical detection systems.

Referring to FIG. 11, another exemplary arrangement of the optical pattern detection is explained wherein an intermediate transfer belt 77 operates in a manner similar to the operation of the intermediate transfer belt 7 of FIG. 3. The intermediate transfer belt 77 includes stoppers 75 and optical patterns 76 arranged on both side edges on the inside surface of the belt 77. A driving roller 80 operates in a manner similar to the driving roller 8 of FIG. 3. The driving roller 80 has constricted portions having a diameter shorter than other portions on both sides, in order not to touch the optical patterns 76, as illustrated in FIG. 11.

In general, the intermediate transfer belt includes a material having a relatively high resistivity and therefore it necessarily bears electrical charges through the processes of charging, image transferring, and so on. In some cases, the electrical charge born on the intermediate transfer belt reaches 1000 volts which may cause a malfunction of the optical detection process. Therefore, it is necessary to discharge such charges to enable the optical detection process. For this reason, in the example shown in FIG. 11, cleaning and discharging brushes 82 are arranged at positions to contact and clean off both optical patterns 76, thereby, optical detectors 78 are enabled to detect the optical patterns 76 without a malfunction caused by the electrical charges.

Figure 12:
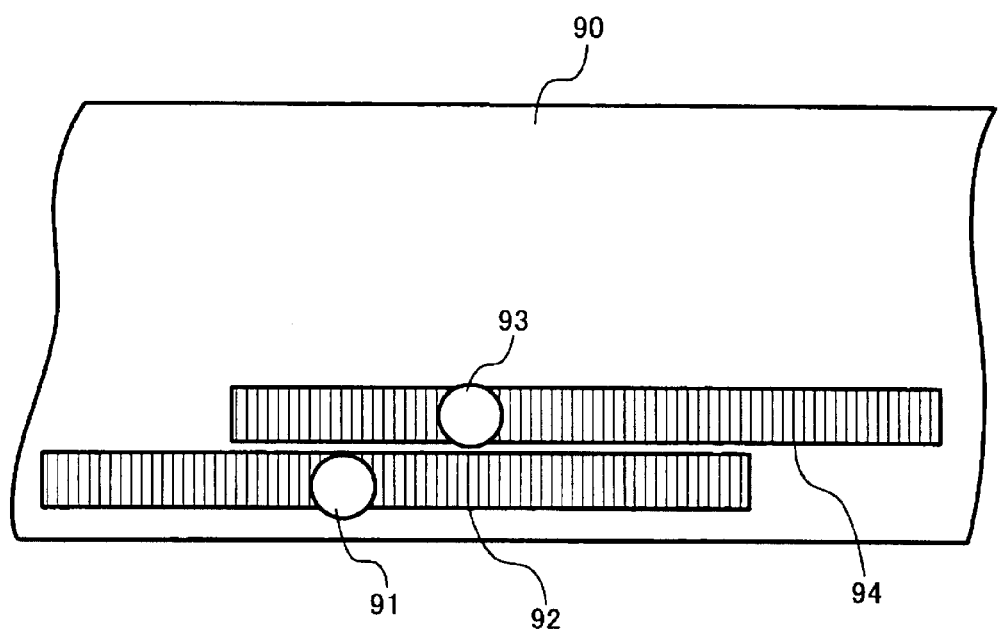
FIG. 12 is a schematic illustration for explaining an optical detection system having a plurality of optical patterns.

Referring to FIG. 12, another exemplary arrangement of the optical pattern detection is illustrated. As shown in FIG. 12, this example arrangement includes an intermediate transfer belt 90 having optical patterns 92 and 94 arranged in a parallel fashion on one side. The optical patterns 92 and 94 may be fixed on either a front or inside surfaces of the intermediate transfer belt 90. It is preferable to place these optical patterns 92 and 94 at positions displaced from each other, as illustrated in FIG. 12. An optical detector 91 is arranged to detect the optical pattern 92 and an optical detector 93 is arranged to detect the optical pattern 94.

With the above-mentioned arrangement, detection by the optical detectors 91 and 93 are alternately switched therebetween so as to perform continuous detection of the optical pattern relative to the entire circumference of the intermediate transfer belt 90.

It is preferable to provide calculation circuit to average the signals that are output from the optical detector 91 and 93 or to change one signal to a supplemental signal to the other so as to use them as a continuous signal in order to control the driving system.

It may also be possible to provide a divided photodiode to cover the optical patterns 92 and 94 to simultaneously read both patterns. In this way, the optical pattern may be divided into a plurality of small optical patterns which may be arranged in parallel in two rows in a staggered configuration so as to continue optical detection along the entire circumference of the intermediate transfer belt by sequentially switching between two rows. With this arrangement, the optical detection is always performed at two different areas and therefore an error in the detection process is expected to be reduced.

Thus, it would be possible to use an optical pattern that is shorter than the entire circumferential length of the intermediate transfer belt. This results in easier manufacturing of the optical pattern and a reduction of manufacturing cost. It would of course be easier to adhere the shorter optical patterns to the intermediate transfer belt.

It may also be possible to arrange the optical patterns at positions away from each other. For example, one optical pattern may be fixed on side edge and the other optical pattern may be arranged at the center of the intermediate transfer belt. With such an arrangement, variations in detected signals may be observed and used to check the skewing of the intermediate transfer belt as well as variations in the motor revolution. Based on this check, it would be possible to perform a balance adjustment and a rotation speed adjustment relative to the intermediate transfer belt.

Figure 13:
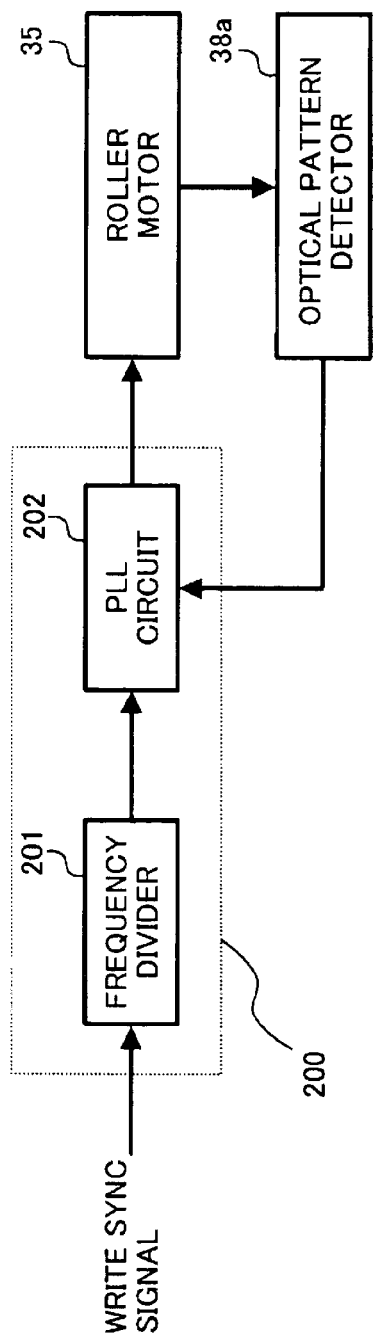
FIG. 13 is a block diagram of a detection feedback control circuit usable in the color image forming apparatus of FIG. 3.

Next, a detection feedback control circuit which is a schematic illustration for explaining an optical pattern detection system is explained with reference to FIG. 13. As illustrated in FIG. 13, the detection feedback control circuit 200 includes a frequency divider 201 and a PLL (phase-locked loop) circuit 202. The detection feedback control circuit 200 is connected to the roller motor 35 and the optical pattern detector 38a, shown in FIG. 4, for example. The frequency divider receives a write sync signal generated per a line by the optical scanning system and divides the write sync signal by an integral number ratio. The divided signal is input to the PLL circuit 202 which locks the phase of the signal. The phase-locked signal is used to control the rotation of the roller motor 35. The roller motor 35 drives the driving roller 8 to move the intermediate transfer belt 7 of FIG. 4, for example. While the intermediate transfer belt 7 is driven to rotate, the optical pattern detector 38a generates a signal representing the detection of the optical pattern 37a and sends the signal to the PLL circuit 202 for adjusting the phase.

Figure 14:
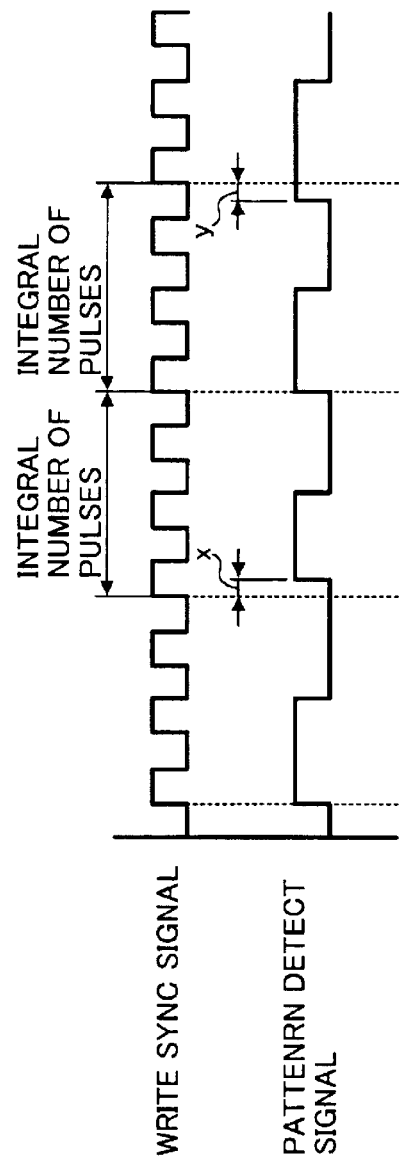
FIG. 14 is a time chart of signals generated in an operation performed by the detection feedback control circuit of FIG. 13.

With reference to FIG. 14, since a resolution in the sub-scanning direction is in proportion to the write sync signal by the integral number ratio, a writing pitch to write an image can be adjusted by feedback control in order to control a difference in phase between rising edges of the detection signal output from the optical pattern detector 38a and the write sync signal, that is, x and y indicated in FIG. 14.

As described above, it is preferable to make the pitch of the optical pattern proportional to the pitch of the write sync signal by an integral number ratio. For example, in an image forming apparatus or a printer having an optical resolution of 600 dpi (i.e., the write sync signal has a pitch of an approximately 40 microns), an optical pattern to be fixed on the intermediate transfer belt may be selected from among 40 microns, 80 microns, 120 microns, and so on.

More preferably, the pitches of the optical patterns formed on the photosensitive drum 3 and the intermediate transfer belt 7 are made identical. With this arrangement, it would be possible to synchronize image formation at an exact image forming position. This synchronization is not necessarily performed during the entire image writing process, but is preferably performed by selecting one of the signals proportional to the rotation signal by an integral number ratio on an as needed basis.

In addition, by using the integral number ratio, it facilitates obtaining synchronization between the detection signals for detecting respective positions on the surfaces of the photosensitive drum and the intermediate transfer belt. Thereby, the signal processing circuit may be simplified resulting in a reduction of the manufacturing cost.

Furthermore, by making the optical patterns formed on the photosensitive drum and the intermediate transfer belt to be identical, it would be possible to use the same circuits for handling the signals associated with the photosensitive drum and the intermediate transfer belt, and to control both the circuits to make these signals identical. Thus, the circuits for handling the signals and controlling the driving mechanisms can be further simplified resulting in an advantageous reduction of the manufacturing cost.

Figure 15:
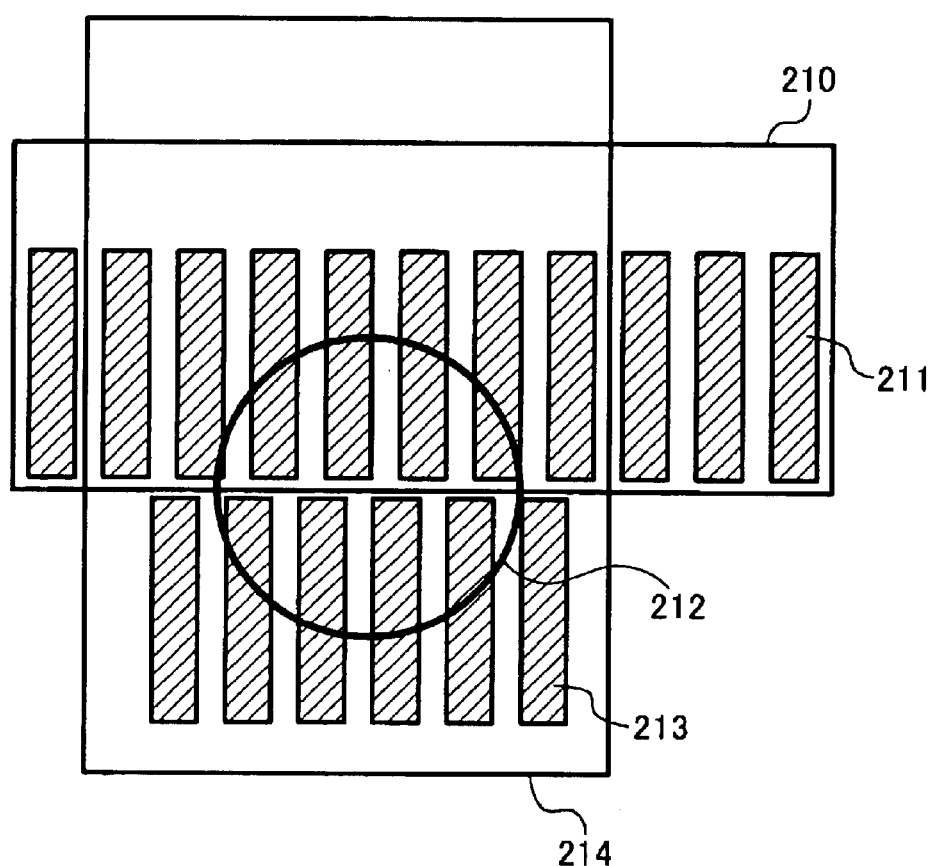
FIGS. 15 and 16 are schematic illustrations for explaining different optical pattern detections in an exemplary embodiment of the present invention.

FIG. 15 illustrates a manner of detecting two optical patterns with one optical pattern detector. In FIG. 15, reference numeral 210 denotes a part of the photosensitive drum and reference numeral 214 denotes a part of the intermediate transfer belt. The photosensitive drum 210 is provided with an optical pattern 211 and the intermediate transfer belt is provided with an optical pattern 213. In this example, the intermediate transfer belt 214 includes a transparent material, and the transfer belt 214 is movable in contact with the photosensitive drum 210. Reference numeral 212 denotes an optical pattern detector. This optical pattern detector 212 is mounted at a position to simultaneously read the optical patterns 211 and 213.

In this example arrangement, the optical pattern 211 of the photosensitive drum and the optical pattern 213 of the transparent intermediate transfer belt 214 are arranged with a slight displacement from each other, as illustrated in FIG. 15, so that the optical pattern detector 212 can detect a composite pattern made of the optical patterns 211 and 213.

Figure 16:
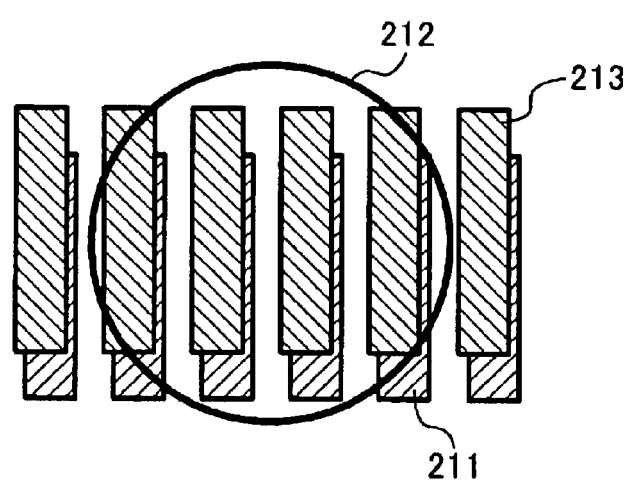

Alternatively, it may be possible to arrange the optical patterns 211 and 213 having an identical pitch on the same axis, as illustrated in FIG. 16, and to control the rotation of the photosensitive drum or the intermediate transfer belt so as to eliminate a displacement of a composite pattern made of the optical patterns 211 and 213.

With the above-described arrangements, it would be possible to perform optical detection with a single element relative to the optical patterns on the photosensitive drum and the intermediate transfer belt. This results in making the optical detection system compact and less expensive. In addition, a data operation can be made in an optimal manner so that the loads to electrical processing system/circuit and to the control system/circuit can be reduced. Further, in the system using the control with the phase difference, the signal feedback is made easier so that the load to the control system is reduced.

Figure 17:
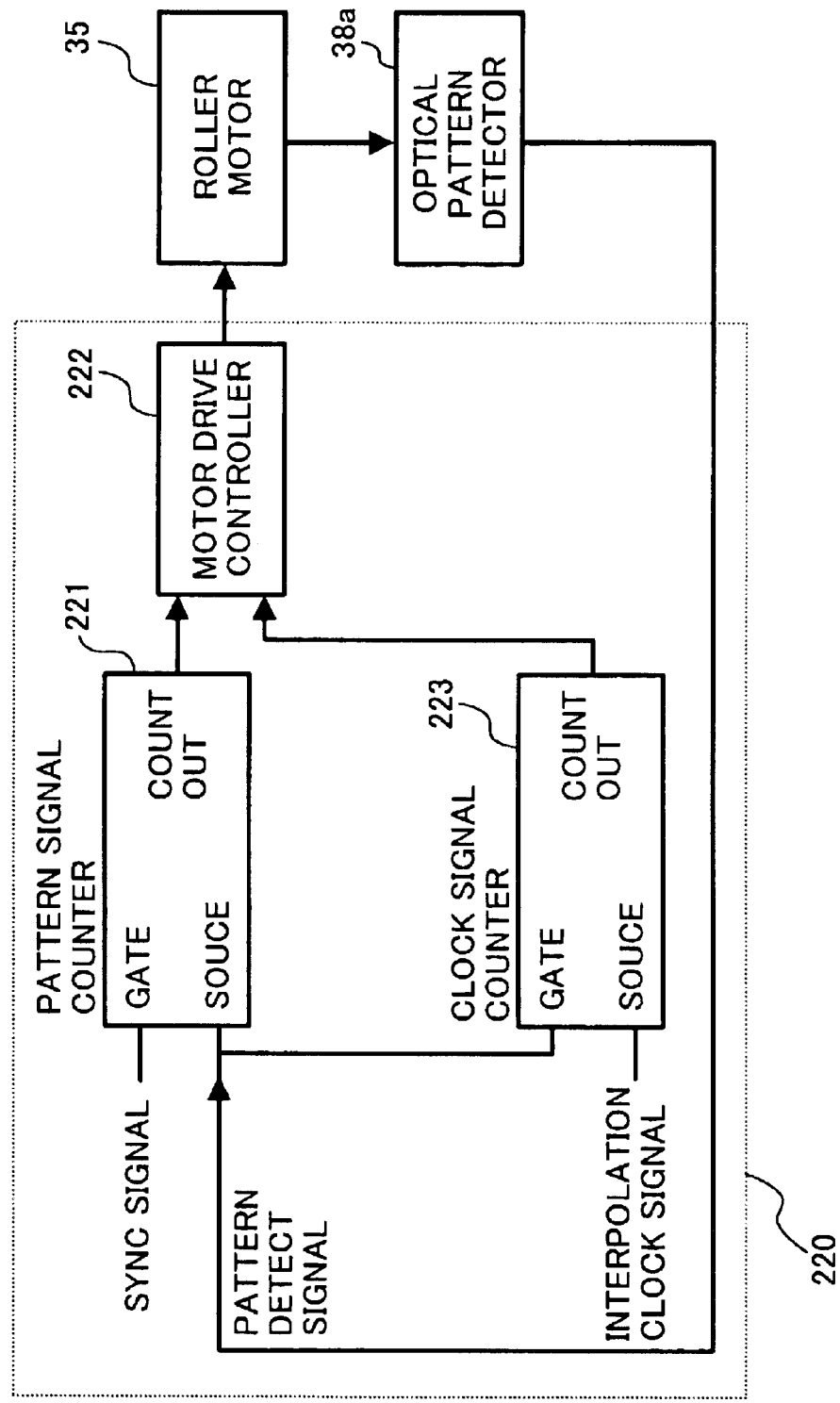
FIG. 17 is a block diagram of another exemplary detection feedback control circuit usable in the color image forming apparatus of FIG. 3.

Next, a detection feedback control circuit 220 using an interpolation clock signal is explained with reference to FIG. 17. The detection feedback control circuit 220 includes a pattern signal counter 221, a motor drive controller 222, and a clock signal counter 223. The pattern signal counter 221 receives at its gate a sync signal generated each time the intermediate transfer belt makes a turn, and at its source the counter 221 receives pattern detection signals. Thus, the pattern signal counter 221 can count the number of the pattern detection signals received during the time the intermediate transfer belt makes a turn. The clock signal counter 223 receives at its gate the pattern detection signals, and at its source the counter 223 receives an interpolation clock signal having a cycle shorter than the cycle of the pattern detection signal. Thus, the clock signal counter 223 is capable of counting the number of interpolation clock signals received during an interval of the pattern detection signals.

The above-mentioned counter signals output from the pattern signal counter 221 and the clock signal counter 223 are input to the motor drive controller 222 which checks and controls an amount of displacement of the pattern detection signal relative to the interpolation clock signals. A controlled drive signal output from the motor drive controller 222 is sent to the roller motor 35, for example. The roller motor 35 is driven with the controlled signal to move the intermediate transfer belt. The optical pattern detector 38a subsequently detects the optical pattern formed on the intermediate transfer belt and the detection signals are returned as the feedback signals to the pattern signal counter 221 and the clock signal counter 223.

It is presumed that a space between two adjacent patterns is 0.1 mm, a frequency of the pattern detection signal is approximately 1 kHz which is varied by approximately 1% due to variations in the rotation speed, and a frequency of the interpolation clock signal is 100 kHz, for example. The motor drive controller 222 performs several jobs including reading of the count data from the pattern signal counter 221 and the clock signal counter 223, internal calculations, and looping of the motor drive output signal. Therefore, the reading of the count data by the motor drive controller 222 is varied by the current processing speed. For example, when the motor drive controller 222 reads the count data from the pattern signal counter 221 and the count data is determined as 10, it is possible that the position is in a range of from 1 mm to 1.1 mm. Based on this, when reading the count data from the clock signal counter 223 and determining that the count data is 50, the motor drive controller 222 calculates a displacement D (mm) with the following calculation using an average rotation speed of 100 mm/s;

$D=S \times C/F$, that is, $D=100(mm/s) \times 50(counts)/100\ k(Hz)=0.05(mm)$, wherein S represents the average rotation speed, C represents the count data, and F represents the frequency of the interpolation clock signal. That is, the motor drive controller 222 determines that the clock signal counter takes 0.05 mm and as a whole the intermediate transfer belt is at a position of 1.05 mm. When the variation rate of the average rotation speed is 1%, an error of the clock signal counter 223 is considered equal to or smaller than 1% and is therefore in a range of from 0.0499 mm to 0.0501 mm. Thus, the optical pattern detection is performed with a relatively high degree of precision.

The motor drive controller 222 includes a CPU (central processing unit) or a microcomputer, a DSP (digital signal processor), and so forth, to achieve the functions for reading the count data from the pattern signal counter 221 and the clock signal counter 223 and calculating the position of the intermediate transfer belt at the time that the above-mentioned count data are read.

In a pattern detection feedback system using a general encoder, an encoder counter is used, and the controller calculates a position and an angle of the intermediate transfer belt based on the count value of the encoder counter at the time the count value is read and compares a resultant value with a target value. However, the count value of the encoder counter involves an uncertainty by a value of a pulse cycle. For example, when the pulse cycle is 0.1 mm, the maximum error of 0.1 mm may occur and therefore the control becomes unstable.

In this example, the clock signal having a cycle of 0.001 mm is used to interpolate the pattern detection signal which is considered as a signal having a constant cycle. In this way, the error of the position detection can be reduced within an error of the variations in the rotation speed.

Figure 18:
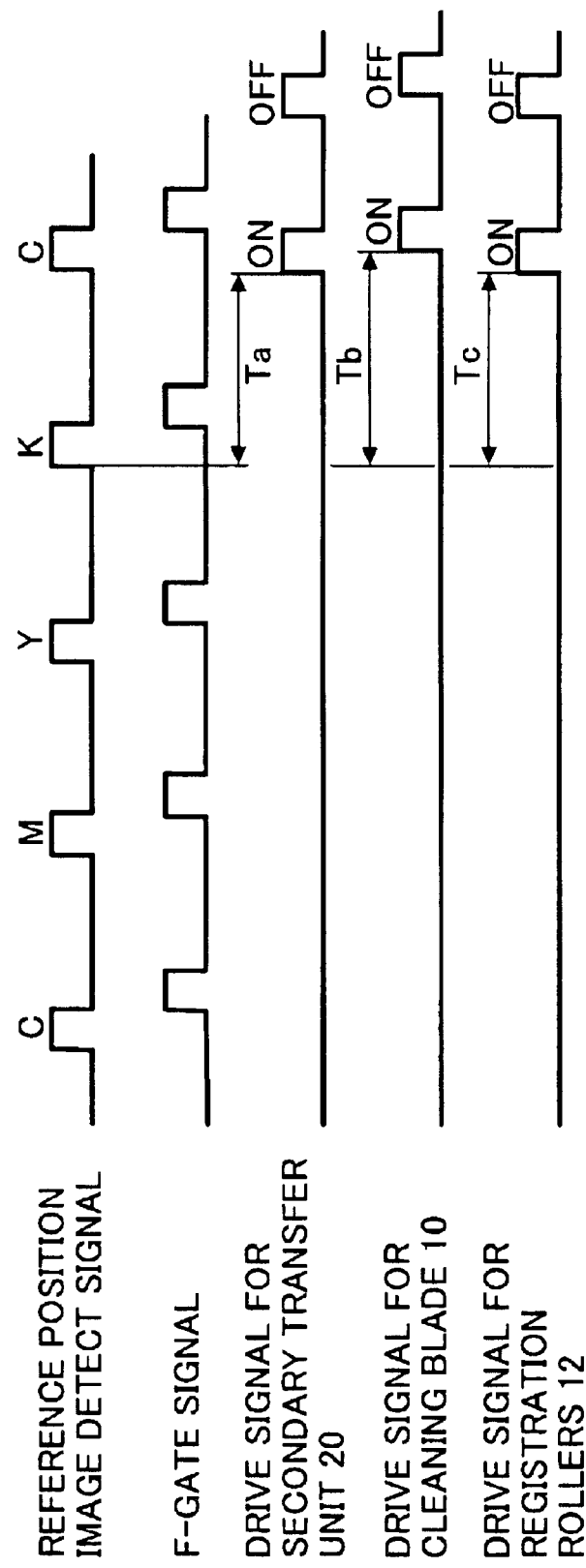
FIG. 18 is a time chart of signals generated in an operation performed by the detection feedback control circuit of FIG. 17.

FIG. 18 is a time chart of the signals generated in the operations of the intermediate transfer mechanism 6 and the secondary transfer mechanism 19 of FIG. 3. In the image transferring process of the color image forming apparatus 100, a reference position image detect signal is generated for each color component. The reference position image detect signal represents a reference position marked in the optical pattern 37a formed on the intermediate transfer belt 7. A first pulse of the reference position image detect signal is generated at a time a first color (i.e., a pulse for the C color) image is generated. Consequently, a C toner image is formed on the photosensitive drum 3 and then the C toner image is transferred onto the intermediate transfer belt 7. After that, a second pulse of the reference position image detect signal is generated at a time a second color (i.e., a pulse for the M color) image is generated. Consequently, an M toner image is formed on the photosensitive drum 3 and then the M toner image is transferred onto the intermediate transfer belt 7 in a way such that the M toner image overlays the C toner image to make a composite toner image. Likewise, a third pulse (i.e., a pulse for the Y color) and a fourth pulse (i.e., a pulse for the K color) are generated, and accordingly a Y toner image and a K toner image are formed and transferred onto the C and M composite toner image on the intermediate transfer belt 7. Thereby, a four-color composite toner image is formed on the intermediate transfer belt 7.

In the above operations, a time Ta from the generation of the K pulse of the reference position image detect signal to a time that the secondary transfer mechanism 19 is caused to contact the intermediate transfer belt 7 is generated by counting the pattern detection signal, that is, by reading the optical pattern 37*a* formed on the intermediate transfer belt 7. A time that the secondary transfer mechanism 19 is caused to disconnect from the intermediate transfer belt 7 is also generated in a similar manner. Likewise, times Tb and Tc to activate the cleaning blade 10 and the registration rollers 12, respectively, are generated by counting the pattern detection signals. Times of deactivation with respect to these components are also generated in a similar manner.

Thereby, a high quality color image can be reproduced without displacement of images relative to the recording sheet P.

Figure 19:
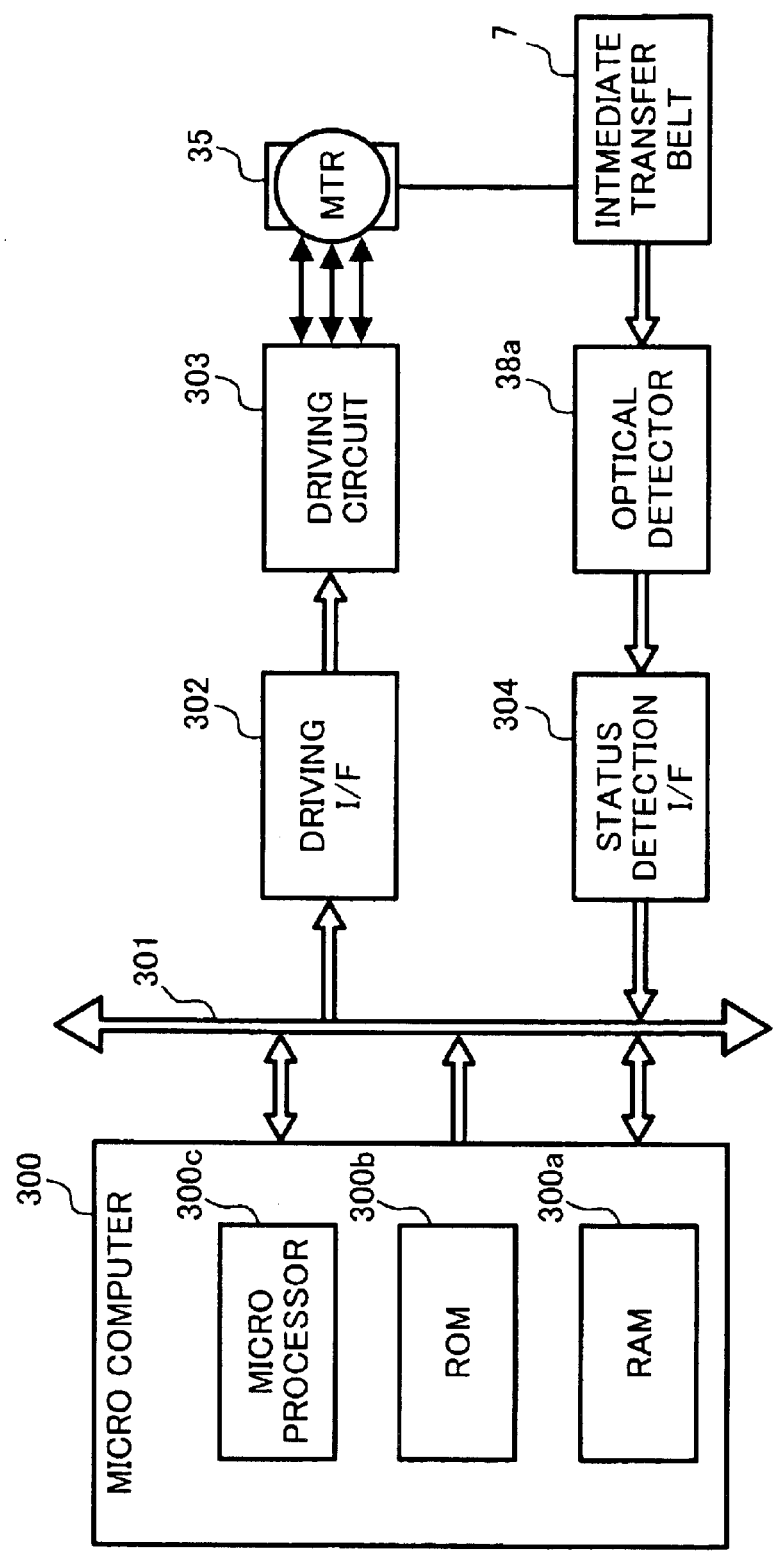
FIG. 19 is a block diagram of an intermediate transfer belt drive system usable in the color image forming apparatus of FIG. 3.

Next, an intermediate transfer belt drive system for driving the intermediate transfer belt 7 of the color image forming apparatus 100 is explained with reference to FIG. 19. As illustrated in FIG. 19, the intermediate transfer belt drive system includes a microcomputer 300, a data bus 301, a driving interface (I/F) 302, a driving circuit 303, the roller motor (MTR) 35, the intermediate transfer belt 7, the optical detector 38*a*, and a status detection interface (I/F) 304.

The microcomputer 300 controls the entire operations of the intermediate transfer belt drive system, and includes a RAM (random access memory) 300*a*, a ROM (read only memory) 300*b*, and a microprocessor 300*c*, which are connected to the data bus 301. An output from the optical detector 38*a* is input to the microcomputer 300 via the status detection interface 304 and the data bus 301. The status detection interface 304 processes and converts the output from the optical detector 38*a* into a digital value, and includes a counter for counting the number of output pulses from the optical detector 38*a*. A control signal output from the microcomputer 300 is transmitted to the driving circuit 303 via the driving interface 302 and the driving circuit 303 drives the roller motor 35 based on the control signal from the microcomputer 300. The intermediate transfer belt 7 is consequently driven by the roller motor 35. Thereby, the intermediate transfer belt 7 is rotated and, as the intermediate transfer belt 7 is rotated, the optical detector 38*a* reads the optical pattern 37*a* on the intermediate transfer belt 7 and generates the optical detection signal which is returned to the microcomputer 300.

In the microcomputer 300, the data of the optical detection signal returned from the optical detector 38*a* via the status detection interface 304 is temporarily stored in the RAM 300*a*, and the microprocessor 300*c* performs a real time process with respect to the data of the optical detection signal stored in the RAM 300*a* to output the control signal to control the revolution of the roller motor 35. Thereby, the position of the intermediate transfer belt 7 is adjusted.

Figure 20:
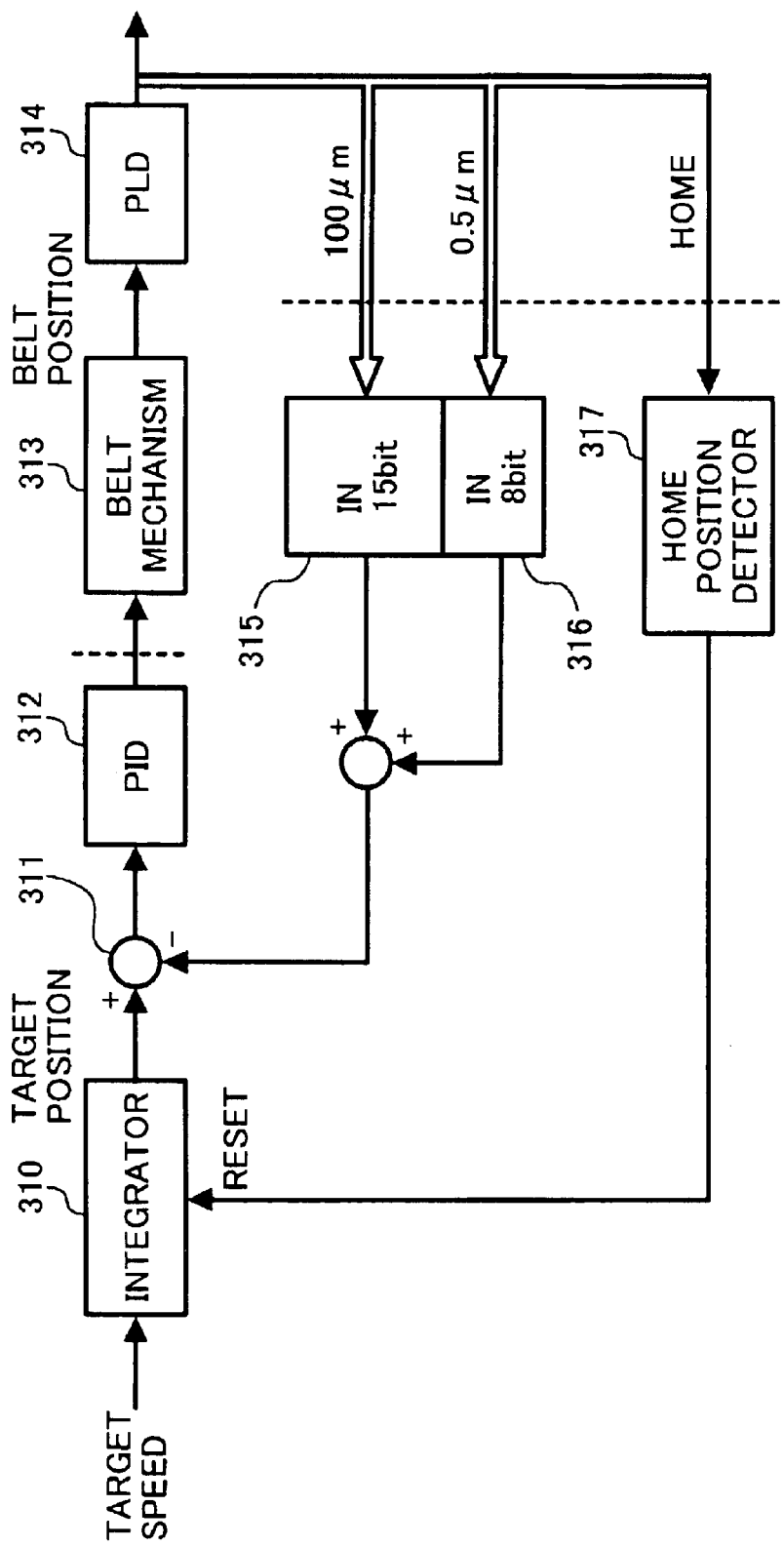
FIG. 20 is a block diagram of another exemplary intermediate transfer belt drive system usable in the color image forming apparatus of FIG. 3.

Next, another intermediate transfer belt drive system for driving the intermediate transfer belt 7 is explained with reference to FIG. 20. As illustrated in FIG. 20, this system includes an integrator 310, a feedback subtracter 311, a PID (proportional, integral, and derivative) controller 312, an intermediate transfer belt system 313, a PLD (programmable logic device) 314, input devices 315 and 316, and a home position detector 317.

The integrator 310 receives a value of a target speed and performs an integral of the target speed value to output a target position. The integrator 310 is reset by a reset signal output from the home position detector 317 which detects at a home position a base marker of the optical pattern 37*a* each time the intermediate transfer belt 7 makes a turn. The feedback subtracter 311 adds a feedback signal sent from the input devices 315 and 316 via a signal adder to the target position calculated by the integrator 310, and outputs a resultant signal to the PID controller 312. The PID controller 312 generates a control signal for controlling the position of the intermediate transfer belt 7 based on the signal sent from the feedback subtracter 311. The intermediate transfer belt system 313 includes the intermediate transfer belt 7, the optical pattern 37*a*, and the optical detector 38*a*, and is driven by the control signal output by the PID controller 312. The optical detection signal is then output from the intermediate transfer belt system 313 and is sent to the PLD 314. The PLD 314 processes the output signal from the intermediate transfer belt system 313 and converts the output signal in such a way that the slits of the optical pattern having a pitch of 100 microns are electrically converted into a resolution of 0.5 microns. As a result, the PLD 314 outputs a pattern detection signal relative to the slits of 100 microns to the input device 315 and a pattern detection signal relative to the slits of 0.5 microns to the input device 316. The slits of 100 microns sent to the input device 315 is 15-bit data and the slits of 0.5 microns to the input device 316 is 8-bit data.

Thus, the actual surface position of the intermediate transfer belt 7 is input to the input devices 315 and 316, and is returned to the feedback subtracter 311 via the signal adder. Then, the feedback signal is subtracted from the target position by the feedback subtracter 311. Based on the resultant signal output from the feedback subtracter 311, the PID controller 312 calculates an amount of position adjustment against the intermediate transfer belt 7 and outputs a control signal to the intermediate transfer belt system 313 to control the actual surface position of the intermediate transfer belt 7.

Figure 21A:
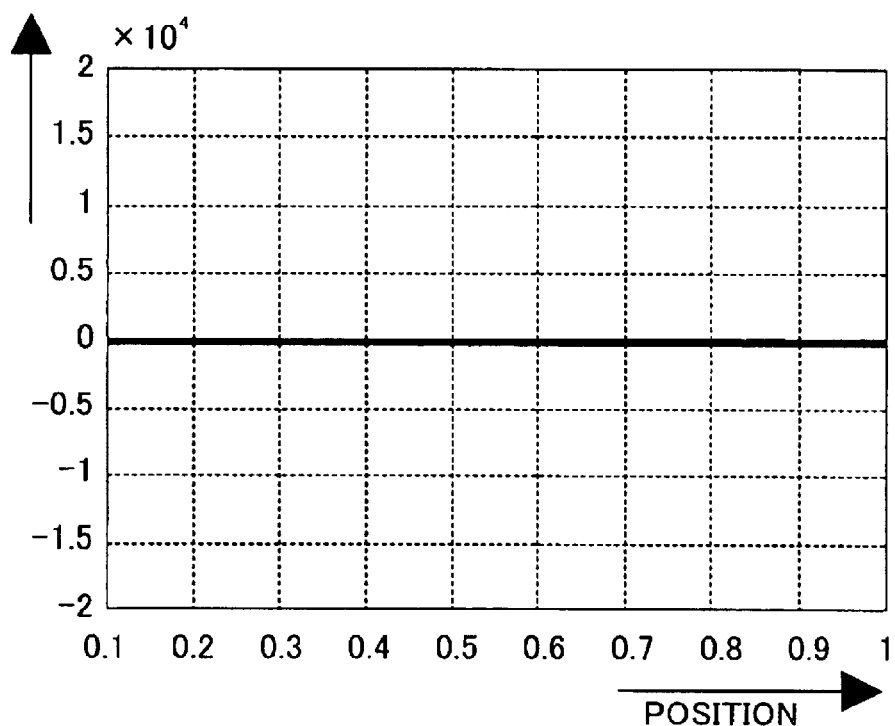
FIGS. 21A and 21B are graphs illustrating a deviation between a target position and an actual surface position of the intermediate transfer belt.
Figure 21B:
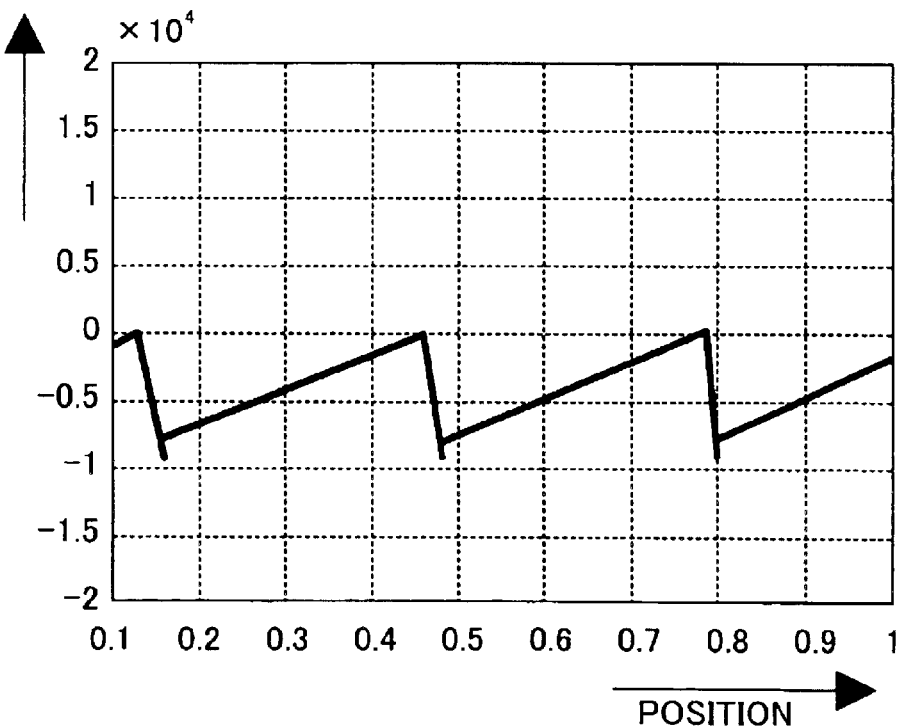

FIGS. 21A and 21B show a deviation between the target position and the actual surface position of the intermediate transfer belt 7. In FIGS. 21A and 21B, the vertical axis represents the deviation and the horizontal axis represents the position.

FIG. 21A shows a case in which the signal output from the input device 316 is used. In this case, the positional resolution of the signal is 0.5 microns and therefore the deviation between the target position and the actual surface position of the intermediate transfer belt 7 is suppressed within ±100 microns.

On the other hand, FIG. 21B shows a case in which the signal output from the input device 315 is used. In this case, the positional resolution of the signal is 100 microns and therefore the deviation between the target position and the actual surface position of the intermediate transfer belt 7 is 100 microns.

Both of FIGS. 21A and 21B show results of the operations performed under the conditions in that a sampling frequency is 1 ms, a linear speed of the intermediate transfer belt 7 is 200 m/s, and a crossover frequency of an open loop transfer function is 50 Hz.

With the above-described structure, the intermediate transfer belt system of FIG. 20 can detect more than one cycle of the pattern at the same time and can perform a stable control of the intermediate transfer belt even when the optical pattern partly has a damage or an obstacle particles such as toner or dust.

The above disclosure may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The above disclosure may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

CROSS REFERENCE TO RELATED APPLICATIONS

The present application claims priority from Japanese patent application No. 2001-242030 filed on Aug. 9, 2001, in the Japanese Patent Office, the entire contents of which are incorporated by reference herein.

What is claimed is:

1. A color image forming apparatus, comprising:
a drum configured to have a photosensitive surface;
an optical scanning mechanism configured to deflect a laser light beam modulated with image data per color to form a latent image on said photosensitive surface;
a developer unit configured to contain a plurality of different color toners for developing said latent image formed on said photosensitive surface with a corresponding color toner into a color toner image;
an intermediate transfer member configured to rotate in synchronism with rotation of said drum and to receive a color toner image developed using each of said different color toners to form on said intermediate transfer member a composite color toner image including multiple images of said different color toners overlaying on one another;
a plurality of movement detecting mechanisms configured to detect respective movements of said drum and said intermediate transfer member; and
a controller configured to control respective rotations of said drum and said intermediate transfer member using a detection of the plurality of movement detecting mechanisms.

2. A color image forming apparatus as defined in claim 1, wherein said optical scanning mechanism generates a sync signal per line scanning, said includes a first pattern uniformly spaced on at least one of a front and inside side edges of said drum, and said intermediate transfer member includes a second pattern uniformly spaced on at least one of a front and inside side edges of said intermediate transfer member.

3. A color image forming apparatus as in claim 2, wherein said plurality of movement detecting mechanisms includes a first optical detecting device configured to detect said first pattern and a second optical detecting device configured to detect said second pattern.

4. A color image forming apparatus as in claim 3, wherein said plurality of movement detecting mechanisms generate respective pattern detection signals, said controller compares said respective pattern detection signals from said first and second optical detecting devices with said sync signal from said optical scanning mechanism, said controller further controls rotation of said intermediate transfer member and rotation of said drum in synchronism with rotation of said intermediate transfer member.

5. A color image forming apparatus as defined in claim 2, further comprising:
a plurality of supporting members configured to drive and support said intermediate transfer member, said plurality of supporting members further configured to maintain a distance from said pattern provided to said intermediate transfer member.

6. A color image forming apparatus as defined in claim 2, further comprising:
a cleaning member configured to clean off a surface of said pattern provided to said intermediate transfer member.

7. A color image forming apparatus as defined in claim 2, further comprising:
a cleaning member configured to clean off a surface of said pattern provided to said drum.

8. A color image forming apparatus as defined in claim 2, further comprising:
a discharging member configured to discharge an electric charge from a surface of said second pattern.

9. A color image forming apparatus as defined in claim 2, further comprising:
a discharging member configured to discharge an electric charge from a surface of said first pattern.

10. A color image forming apparatus as defined in claim 2, wherein each of said first and second patterns is divided into a plurality of short patterns arranged in parallel in at least two rows.

11. A color image forming apparatus as defined in claim 2, wherein each of said first and second patterns is an integral multiple of an image writing pitch according to a resolution of said optical scanning mechanism.

12. A color image forming apparatus as defined in claim 3, wherein at least one of said first and second optical detecting devices is arranged at a position close to a place where said drum contacts said intermediate transfer member.

13. A color image forming apparatus as defined in claim 10, wherein said plurality of short patterns arranged in parallel in at least two rows are arranged with space between at least two rows, and said plurality of short patterns are read with a single optical detector capable of generating a composite detection signal for each of said drum and said intermediate transfer member, and wherein said controller controls rotation of each of said drum and said intermediate transfer member.

14. A color image forming apparatus as defined in claim 10, wherein said plurality of short patterns arranged in parallel in at least two rows are overlaid between at least two rows and with a single pitch, said plurality of short patterns are read with a single optical detector capable of generating a composite detection signal for each of said drum and said intermediate transfer member, and said controller is capable of controlling rotation of each of said drum and said intermediate transfer member.

15. A color image forming apparatus as defined in claim 3, further comprising:
a cleaning mechanism configured to clean residual toner off a surface of said intermediate transfer member, wherein said second pattern includes a reference base mark, said second optical detecting device detects said reference base mark and generates a reference base mark signal, and said controller includes a counting circuit configured to count a number of pattern detection signals based on said reference base mark signal and controls a connection and disconnection motion of said cleaning mechanism to said intermediate transfer member based on the count of said number of pattern detection signals.

16. A color image forming apparatus as defined in claim 3, further comprising:

a secondary transfer mechanism configured to transfer said composite color toner image formed on said intermediate transfer member onto a recording sheet, wherein said second pattern includes a reference base mark, said second optical detecting device detects said reference base mark and generates a reference base mark signal, and said controller includes a counting circuit configured to count a number of pattern detection signals based on said reference base mark signal and controls said secondary transfer mechanism to transfer said composite color toner image formed on said intermediate transfer member onto a recording sheet.

17. A color image forming apparatus as defined in claim 3, further comprising:

a registration roller configured to feed a recording sheet towards said intermediate transfer member in synchronism with rotation of said intermediate transfer member, wherein said second pattern includes a reference base mark, said second optical detecting device detects said reference base mark and generates a reference base mark signal, and said controller includes a counting circuit configured to count a number of pattern detection signals based on said reference base mark signal and controls said registration roller to feed a recording sheet towards said intermediate transfer member in synchronism with said rotation of said intermediate transfer member.

18. A color image forming apparatus as defined in claim 3, wherein said second optical detecting device is arranged at a position at which said intermediate transfer belt member is in a horizontal position.

19. A color image forming apparatus as defined in claim 3, wherein said second optical detecting device is arranged at a position minimally affected by mechanical vibrations.

20. A color image forming apparatus as defined in claim 2, further comprising:

a damper mechanism configured to reduce mechanical vibrations affecting said intermediate transfer member.

21. A color image forming apparatus as defined in claim 3, wherein said second pattern includes a reference base mark, said second optical detecting device detects said reference base mark and generates a reference base mark signal, and said controller includes a pattern detection counting circuit configured to count a number of pattern detection signals based on said reference base mark signal and a clock signal counter configured to count based on said reference base mark signal a number of clock signals having a clock cycle at least shorter than a cycle of said pattern detection signals, and said controller controls rotation of said intermediate transfer member based on a number of pattern detection signals and a number of clock signals counted during two sequential pulses of said reference base mark signal.

22. A color image forming apparatus as defined in claim 3, wherein said second optical detecting device uses multiple light beams to detect said patterns.

23. A color image forming apparatus, comprising:

a drum having a photosensitive surface;

scanning means for deflecting a laser light beam modulated in accordance with image data per color component, among a plurality of color components, to form a latent image on said photosensitive surface;

developer means configured to contain a plurality of different color toners for developing said latent image formed on said photosensitive surface with a corresponding color toner into a color toner image;

intermediate transferring means for being rotated in synchronism with rotation of said drum, and receiving a color toner image developed using each of said different color toners to form on said intermediate transferring means a composite color toner image including multiple images of said different color toners overlaying on one another;

a plurality of movement detecting means for detecting respective movements of said drum and said intermediate transferring means; and controlling means for controlling respective rotations of said drum and said intermediate transferring means using a detection of the plurality of movement detecting means.

24. A color image forming apparatus as defined in claim 23, wherein said scanning means generates a sync signal per line scanning, said drum includes a first pattern uniformly spaced on at least one of a front and inside side edges of said drum and said intermediate transferring means includes a second pattern uniformly spaced on at least one of a front and inside side edges of said intermediate transferring means.

25. A color image forming apparatus as in claim 24 wherein said plurality of movement detecting means include a first optical detecting means configured to detect said first pattern and a second optical detecting means configured to detect said second pattern.

26. A color image forming apparatus as in claim 25, wherein said plurality of movement detecting means generate respective pattern detection signals, said controlling means compares said respective pattern detection signals from said first and second optical detecting means with said sync signal from said scanning means, said controlling means further controls rotation of said intermediate transferring means and rotation of said drum in synchronism with rotation of said intermediate transferring means.

27. A color image forming apparatus as defined in claim 24, further comprising:

a plurality of supporting means for driving and supporting said intermediate transferring means, said plurality of supporting means further maintaining a distance from said second pattern.

28. A color image forming apparatus as defined in claim 24, further comprising:

cleaning means for cleaning off a surface of said second pattern.

29. A color image forming apparatus as defined in claim 24, further comprising:

cleaning means for cleaning off a surface of said first pattern.

30. A color image forming apparatus as defined in claim 24, further comprising:

discharging means for discharging an electric charge from a surface of said second pattern.

31. A color image forming apparatus as defined in claim 24, further comprising:

discharging means discharging an electric charge from a surface of said first pattern.

32. A color image forming apparatus as defined in claim 24, wherein each of said first and second patterns is divided into a plurality of short patterns arranged in parallel in at least two rows.

33. A color image forming apparatus as defined in claim 24, wherein each of said first and second patterns is an integral multiple of an image writing pitch according to a resolution of said scanning means.

34. A color image forming apparatus as defined in claim 25, wherein at least one of said first and second optical detecting means is arranged at a position close to a place where said drum contacts said intermediate transferring means.

35. A color image forming apparatus as defined in claim 32, wherein said plurality of short patterns arranged in parallel in at least two rows are arranged with space between at least two rows, and said plurality of short patterns are read with a single optical detector capable of generating a composite detection signal for each of said drum and said intermediate transferring means, and wherein said controlling means controls rotation of each of said drum and said intermediate transferring means.

36. A color image forming apparatus as defined in claim 32, wherein said plurality of short patterns arranged in parallel in at least two rows are arranged in an overlaid manner between at least two rows and with a single pitch, said plurality of short patterns are read with a single optical detector capable of generating a composite detection signal for each of said drum and said intermediate transferring means, and said controlling means controlling rotation of each of said drum and said intermediate transferring means.

37. A color image forming apparatus as defined in claim 25, further comprising:
cleaning means for cleaning residual toner off of a surface of said intermediate transferring means, wherein said second pattern includes a reference base mark, said second optical detecting means detects said reference base mark and generates a reference base mark signal, and said controlling means includes counting means for counting a number of pattern detection signals based on said reference base mark signal and controls a connection and disconnection motion of said cleaning means to said intermediate transferring means based on the count of said number of pattern detection signals.

38. A color image forming apparatus as defined in claim 24, further comprising:
secondary transfer means for transferring said composite color toner image formed on said intermediate transferring means onto a recording sheet, wherein said second pattern includes a reference base mark, said second optical detecting means detects said reference base mark and generates a reference base mark signal, and said controlling means includes counting means for counting a number of pattern detection signals based on said reference base mark signal and controls said secondary transfer means for transferring said composite color toner image formed on said intermediate transferring means onto a recording sheet.

39. A color image forming apparatus as defined in claim 25, further comprising:
registration feeding means for feeding a recording sheet towards said intermediate transferring means in synchronism with rotation of said intermediate transferring means, wherein said second pattern includes a reference base mark, said second optical detecting means detects said reference base mark and generates a reference base mark signal, and said controlling means includes counting means for counting a number of pattern detection signals based on said reference base mark signal and controls said registration feeding means to feed a recording sheet towards said intermediate transferring means in synchronism with rotation of said intermediate transferring means.

40. A color image forming apparatus as defined in claim 25, wherein said second optical detecting means is arranged at a position at which said intermediate transferring means is in a horizontal position.

41. A color image forming apparatus as defined in claim 25, wherein said second optical detecting means is arranged at a position that is minimally affected by mechanical vibrations.

42. A color image forming apparatus as defined in claim 24, further comprising:
damper means for reducing mechanical vibrations affecting said intermediate transferring means.

43. A color image forming apparatus as defined in claim 25, wherein said second pattern includes a reference base mark, said second optical detecting means detects said reference base mark and generates a reference base mark signal, and said controlling means includes pattern detection counting means for counting a number of pattern detection signals based on said reference base mark signal and clock signal counting means for counting based on said reference base mark signal a number of clock signals having a clock cycle at least shorter than a cycle of said pattern detection signals, and said controlling means controls rotation of said intermediate transferring means based on a number of pattern detection signals and a number of clock signals counted during two sequential pulses of said reference base mark signal.

44. A color image forming apparatus as defined in claim 25, wherein said second optical detecting means uses multiple light beams to detect said patterns.

45. A method of forming a color image, comprising the steps of: rotating a photosensitive surface;
deflecting a light beam modulated with image data per color to form a latent image on said photosensitive surface;
developing said latent image into a color toner image with a corresponding color toner from among a plurality of different color toners;
rotating an intermediate transfer belt member in synchronism with rotation of said photosensitive surface;
receiving, in an overlaying fashion, color toner images developed using each of said different color toners to form a composite color toner image on said intermediate transfer belt member;
detecting respective movements of said photosensitive surface and said intermediate transfer belt member; and
controlling respective rotations of said photosensitive surface and said intermediate transfer belt member using results of detection performing by said detecting step.

46. A color image forming method as in claim 45, further comprising:
generating a sync signal per line scanning using said deflecting step;
providing said photosensitive surface and said intermediate transfer belt member with respective patterns uniformly spaced on at least one of front and inside side edges of said photosensitive surface and said intermediate transfer belt member; and detecting said respective patterns of said photosensitive surface and said intermediate transfer belt from said detecting step.

47. The method as in claim 46, further comprising the steps of generating respective pattern detection signals;

using said controlling step to compare said respective pattern detection signals for said photosensitive surface and said intermediate transfer belt member with said sync signal from said deflecting step; and controlling rotation of said intermediate transfer belt member and rotation of said photosensitive surface in synchronism with rotation of said intermediate transfer belt member.

48. In a color image forming apparatus having a drum with a photosensitive surface, an optical scanning mechanism, a developer unit with a plurality of different color toners, a method of forming a color image comprising the steps of:

deflecting a light beam modulated with image data per color component, among a plurality of color components, to form a latent image on the photosensitive surface;

developing a latent image into a color toner image for each of the color plurality of color components using a respective color toner from said plurality of different color toners;

rotating an intermediate transfer belt member in synchronism with rotation of the photosensitive surface based on detected movements of the photosensitive surface and the intermediate transfer belt member; and receiving in an overlaying fashion, on said intermediate transfer belt member, each of said color toner images to form a composite color toner image.

49. The method as in claim 48, further comprising:

detecting movements of the photosensitive surface and said intermediate transfer belt member; and controlling rotation of the photosensitive surface and said intermediate transfer belt member.

50. The method as in claim 49, further comprising:

generating a sync signal per line scanning using said deflecting step; and providing the photosensitive surface and said intermediate transfer belt member with respective patterns, said respective patterns being uniformly spaced on at least one of a front and inside side edges of the photosensitive surface and said intermediate transfer belt member.

51. The method as in claim 50, further comprising the step of detecting said respective patterns of said photosensitive surface and said intermediate transfer belt member from said detecting step.

52. The method as in claim 51, further comprising the steps of:

generating respective pattern detection signals;

comparing said respective pattern detection signals for the photosensitive surface and said intermediate transfer belt with said sync signal from said deflecting step; and controlling rotation of said intermediate transfer belt member and rotation of said photosensitive surface in synchronism with rotation of said intermediate transfer belt member.

53. A color image forming apparatus having a drum with a photosensitive surface, an optical scanning mechanism, a developer unit with a plurality of different color toners, the color image forming apparatus further comprising:

means for deflecting a light beam modulated with image data per color component, among a plurality of color components, to form a latent image on the photosensitive surface;

means for developing a latent image into a color toner image for each of the color plurality of color components using a respective color toner from said plurality of different color toners;

means for rotating an intermediate transfer belt member in synchronism with rotation of the photosensitive surface based on detected movements of the intermediate transfer belt member and the photosensitive surface; and means for receiving in an overlaying fashion, on said intermediate transfer belt member, each of said color toner images to form a composite color toner image.

54. The color image forming apparatus as in claim 53, further comprising:

means for detecting movements of the photosensitive surface and said intermediate transfer belt member; and means for controlling rotation of the photosensitive surface and said intermediate transfer belt member.

55. The color image forming apparatus as in claim 54, further comprising:

means for generating a sync signal per line scanning using said means for deflecting; and means for providing the photosensitive surface and said intermediate transfer belt member with respective patterns, said respective patterns being uniformly spaced on at least one of a front and inside side edges of the photosensitive surface and said intermediate transfer belt member.

56. The color image forming apparatus as in claim 55, further comprising:

means for detecting said respective patterns of said photosensitive surface and said intermediate transfer belt member from said means for detecting.

57. The color image forming apparatus as in claim 56, further comprising:

means for generating respective pattern detection signals;

means for comparing said respective pattern detection signals for the photosensitive surface and said intermediate transfer belt with said sync signal from said means for deflecting; and means for controlling rotation of said intermediate transfer belt member and rotation of said photosensitive surface in synchronism with rotation of said intermediate transfer belt member.

* * * * *